US012619654B2

(12) United States Patent     (10) Patent No.:   US 12,619,654 B2

Alayrac et al.     (45) Date of Patent:     May 5, 2026

(54) LANGUAGE MODEL FOR PROCESSING A MULTI-MODE QUERY INPUT

(71) Applicant: GDM Holding LLC, Mountain View, CA (US)

(72) Inventors: Jean-Baptiste Alayrac, London (GB); Jeffrey Donahue, London (GB); Karel Lenc, London (GB); Karen Simonyan, London (GB); Malcolm Kevin Campbell Reynolds, London (GB); Pauline Luc, London (GB); Arthur Mensch, Paris (FR); Iain Barr, Cambridge (GB); Antoine Miech, London (GB); Yana Elizabeth Hasson, Paris (FR); Katherine Elizabeth Millican, London (GB); Roman Ring, London (GB)

(73) Assignee: GDM Holding LLC

( * ) Notice: Subject to any disclaimer, the term of this patent is extended or adjusted under 35 U.S.C. 154(b) by 474 days.

(21) Appl. No.: 18/141,337

(22) Filed: Apr. 28, 2023

(65) Prior Publication Data

US 2023/0350936 A1     Nov. 2, 2023

Related U.S. Application Data

(60) Provisional application No. 63/336,192, filed on Apr. 28, 2022.

(51) Int. Cl.
| | |
|---|---|
| *G06F 16/432* | (2019.01) |
| *G06F 16/438* | (2019.01) |
| *G06F 40/284* | (2020.01) |

(52) U.S. Cl.
CPC .......... *G06F 16/432* (2019.01); *G06F 16/438* (2019.01); *G06F 40/284* (2020.01)

(58) Field of Classification Search
CPC ...................................................... G06F 16/432
USPC ............................................................ 706/15
See application file for complete search history.

(56) References Cited

U.S. PATENT DOCUMENTS

| | | | | |
|---|---|---|---|---|
| 8,875,110 | B2 * | 10/2014 | Lee ........................... | G06F 8/75 |
| | | | | 717/142 |
| 11,615,084 | B1 * | 3/2023 | Echeverria ............... | G06N 5/04 |
| | | | | 707/721 |
| 2021/0232773 | A1 | 7/2021 | Wang et al. | |
| 2021/0365633 | A1 * | 11/2021 | Wagner ..................... | G06N 3/09 |
| 2022/0237380 | A1 | 7/2022 | Chen et al. | |
| 2022/0245156 | A1 * | 8/2022 | Kulkarni ............... | H04L 45/741 |

FOREIGN PATENT DOCUMENTS

| | | |
|---|---|---|
| WO | WO 2021010203 | 1/2021 |

OTHER PUBLICATIONS

International Preliminary Report on Patentability in International Appln. No. PCT/EP2023/061330, mailed on Nov. 7, 2024, 14 pages.

(Continued)

*Primary Examiner* — Muluemebet Gurmu

(74) *Attorney, Agent, or Firm* — Fish & Richardson P.C.

(57) ABSTRACT

A query processing system is described which receives a query input comprising an input token string and also at least one data item having a second, different modality, and generates a corresponding output token string.

23 Claims, 10 Drawing Sheets

(56) References Cited

OTHER PUBLICATIONS

Aghajanyan et al., "CM3: A Causal Masked Multimodal Model of the Internet," CoRR, Submitted on Jan. 19, 2022, arXiv:2201. 07520v1, 20 pages.

Alayrac et al., "Self-Supervised MultiModal Versatile Networks," 34th Conference on Neural Information Processing Systems (NeurIPS 2020), 2020, 13 pages.

Antol et al., "VQA: Visual Question Answering," 2015 IEEE International Conference on Computer Vision (ICCV), 2015, pp. 2425-2433.

Bachlechner et al., "ReZero is All You Need: Fast Convergence a Large Depth," Proceedings of the Thirty-Seventh Conference on Uncertainty in Artificial Intelligence (UAI 2021), 2021, PMLR 161, pp. 1352-1361.

Bain et al,. "Frozen in Time: A Joint Video and Image Encoder for End-to-End Retrieval," 2021 IEEE/CVF International Conference on Computer Vision (ICCV), 2021, pp. 1728-1738.

Bao et al., "VLMo: Unified Vision-Language Pre-Training with Mixture-of-Modality-Experts," CoRR, Submitted on Nov. 3, 2021, arXiv:2111.02358v1, 15 pages.

Bertinetto et al., "Learning feed-forward one-shot learners," 30th Conference on Neural Information Processing Systems (NIPS 2016), 2016, 9 pages.

Bertinetto et al., "Meta-learning with differentiable closed-form solvers," CoRR, Submitted on May 21, 2018, arXiv:1805.08136v1, 11 pages.

Bridle, "Probabilistic Interpretation of Feedforward Classification Network Outputs, with Relationships to Statistical Pattern Recognition," Neurocomputing, 1990.

Brock et al., "High-Performance Large-Scale Image Recognition Without Normalization," CoRR, Submitted on Feb. 11, 2021, arXiv:2102.06171v1, 22 pages.

Brown et al., "Language Models are Few-Shot Learners," 34th Conference on Neural Information Processing Systems (NeurIPS 2020), 2020, 25 pages.

Buolamwini et al., "Gender Shades: Intersectional Accuracy Disparities in Commercial Gender Classification," Proceedings of the Ist Conference on Fairness, Accountability, and Transparency, 2018, 15 pages.

Carion et al., "End-to-End Object Detection with Transformers," European Conference on Computer Vision, 2020, 17 pages.

Changpinyo et al., "Conceptual 12M: Pushing Web-Scale Image-Text Pre-Training to Recognize Long-Tail Visual Concepts," Changpinyo, Soravit et al. "Conceptual 12M: Pushing Web-Scale Image-Text Pre-Training To Recognize Long-Tail Visual Concepts." 2021 IEEE/CVF Conference on Computer Vision and Pattern Recognition (CVPR), 2021, pp. 3558-3568.

Chen et al., "Microsoft COCO Captions: Data Collection and Evaluation Server," CoRR, Submitted on Apr. 1, 2015, arXiv:1504. 00325v1, 7 pages.

Chen et al., "UNITER: Universal Image-TExt Representation Learning," European Conference on Computer Vision, 2020, 17 pages.

Cho et al., "Unifying Vision-and-Language Tasks via Text Generation," Proceedings of the 38th International Conference on Machine Learning, PMLR 139, 2021, 12 pages.

Chowdhery et al., "PaLM: Scaling Language Modeling with Pathways," CoRR, Submitted on Apr. 5, 2022, arXiv:2204.02311v1, 83 pages.

Dai et al., "Enabling Multimodal Generation on CLIP via Vision-Language Knowledge Distillation," Findings of the Association for Computational Linguistics: ACL 2022, May 2022, pp. 2383-2395.

Das et al., "Visual Dialog.," 2017 IEEE Conference on Computer Vision and Pattern Recognition (CVPR), 2017, pp. 326-335.

Desai et al., "VirTex: Learning Visual Representations from Textual Annotations," 2021 IEEE/CVF Conference on Computer Vision and Pattern Recognition (CVPR), 2021, pp. 11162-11173.

Devlin et al., "BERT: Pre-training of Deep Bidirectional Transformers for Language Understanding," CoRR, Submitted on Oct. 11, 2018, arXiv:1810.04805v1, 14 pages.

DeVries et al., "Does Object Recognition Work for Everyone?," CoRR, Submitted on Jun. 6, 2019, arXiv:1906.02659v1, 8 pages.

Doersch et al., "CrossTransformers: spatially-aware few-shot transfer," 3rth Conference on Neural Information Processing Systems (NeurIPS 2020), 2020, 13 pages.

Donahue et al., "Long-Term Recurrent Convolutional Long-Term Recurrent Convolutional Networks for Visual Recognition and Description," IEEE Transactions on Pattern Analysis and Machine Intelligence, 2015, pp. 2625-2634.

Eichenberg et al. ,"MAGMA—Multimodal Augmentation of Generative Models through Adapter-based Finetuning," CoRR, Submitted on Dec. 9, 2021, arXiv:2112.05253v1, 11 pages.

Finn et al., "Model-Agnostic Meta-Learning for Fast Adaptation of Deep Networks," Proceedings of the 34th International Conference on Machine Learning, PMRL 70, 2017, 10 pages.

Fu et al., "VIOLET : End-to-End Video-Language Transformers with Masked Visual-token Modeling," CoRR, Submitted on Nov. 24, 2021, arXiv:2111.12681v1, 19 pages.

Gan et al., "Large-Scale Adversarial Training for Vision-and-Language Representation Learning," 34th Conference on Neural Information Processing Systems (NeurIPS 2020), 2020, 13 pages.

Gebru et al., "Datasheets for Datasets," Communications of the ACM, 2021, 64(12):86-92.

GitHub.com [online], "google / jax," available on or before Nov. 22, 2018 via Internet Archive: Wayback Machine URL<https://web. archive.org/web/20181122121702/https://github.com/google/jax>, retrieved on Jul. 26, 2024, retrieved from URL<http://github.com/ google/jax>, 8 pages.

GitHub.com [online], "google-deepmind / dm-haiku," available on or before Mar. 5, 2020, via Archive: Wayback Machine URL<https:// web.archive.org/web/20200305221206/http://github.com/deepmind/ dm-haiku>, retrieved on Jul. 26, 2024, retrieved from URL<https:// github.com/google-deepmind/dm-haiku>, 11 pages.

Gordon et al., "Meta-Learning Probabilistic Inference For Prediction," CoRR, Submitted on Nov. 28, 2018, arXiv:1805.09921v3, 21 pages.

Graves, "Generating Sequences With Recurrent Neural Networks," CoRR, Submitted on Aug. 4, 2013, arXiv:1308.0850v1, 43 pages.

Griffiths et al., "Doing more with less: meta-reasoning and meta-learning in humans and machines," Current Opinion in Behavioral Sciences, 2019, 29:24-30.

Gui et al., "KAT: A Knowledge Augmented Transformer for Vision-and-Language," CoRR, Submitted on Dec. 16, 2021, arXiv:2112. 08614v1, 11 pages.

Gurari et al., "VizWiz Grand Challenge: Answering Visual Questions from Blind People," 2018 IEEE/CVF Conference on Computer Vision and Pattern Recognition, 2018, pp. 3608-3617.

Haviv et al., "Transformer Language Models without Positional Encodings Still Learn Positional Information," CoRR, Submitted on Mar. 30, 2022, arXiv:2203.16634v1, 7 pages.

Hendricks et al., "Decoupling the Role of Data, Attention, and Losses in Multimodal Transformers," Transactions of the Association for Computational Linguistics, 2021, vol. 9, pp. 570-585.

Hendricks et al., "Women Also Snowboard: Overcoming Bias in Captioning Models," European Conference on Computer Vision (ECCV 2018), 2018, 17 pages.

Hendrycks et al., "Gaussian Error Linear Units (GELUs)," CoRR, Submitted on Nov. 11, 2018, arXiv:1606.08415v3, 9 pages.

Hochreiter et al., "Long Short-Term Memory," Neural Computation, 1997, 9(8):1735-1780.

Hoffmann et al., "Training Compute-Optimal Large Language Models," CoRR, Submitted on Mar. 29, 2022, arXiv:2203.15556v1, 36 pages.

Houlsby et al., "Parameter-Efficient Transfer Learning for NLP," Proceedings of the 36th International Conference on Machine Learning, PMLR 97, 2019, 10 pages.

Howard et al., "Universal Language Model Fine-tuning for Text Classification," CoRR, Submitted on May 14, 2018, arXiv:1801. 06146v2, 12 pages.

Hu et al., "Scaling Up Vision-Language Pre-training for Image Captioning," CoRR, Submitted on Nov. 24, 2021, arXiv:2111. 12233v1, 14 pages.

(56)     References Cited

OTHER PUBLICATIONS

Huang et al., "Attention on Attention for Image Captioning," 2019 IEEE/CVF International Conference on Computer Vision (ICCV), 2019, pp. 4634-4643.

International Search Report and Written Opinion in International Appln. No. PCT/EP2023/061330, mailed on Aug. 4, 2023, 21 pages.

Islam et al., "Global Pooling, More than Meets the Eye: Position Information is Encoded Channel-Wise in CNNs," 2021 IEEE/CVF International Conference on Computer Vision (ICCV), 2021, pp. 793-801.

Jaegle et al., "Perceiver: General Perception with Iterative Attention," CoRR, Submitted on Mar. 4, 2021, arXiv:2103.03206v1, 16 pages.

Jain et al., "MURAL: Multimodal, Multitask Retrieval Across Languages," CoRR, Submitted on Sep. 10, 2021, arXiv:2109.05125v1, 15 pages.

Jia et al., "Scaling Up Visual and Vision-Language Representation Learning With Noisy Text Supervision," CoRR, Submitted on Feb. 11, 2021, arXiv:2102.05918v1, 11 pages.

Jozefowicz et al., "Exploring the Limits of Language Modeling," CoRR, Submitted on Feb. 7, 2016, arXiv:1602.02410v1, 11 pages.

Kaplan et al., "Scaling Laws for Neural Language Models," CoRR, Submitted on Jan. 23, 2020, arXiv:2001.08361v1, 30 pages.

Kiela et al., "The Hateful Memes Challenge: Detecting Hate Speech in Multimodal Memes," 34th Conference on Neural Information Processing Systems (NeurIPS 2020), 2020, 14 pages.

Kumar et al., "Affective Feedback Synthesis Towards Multimodal Text and Image Data," CoRR, Submitted on Mar. 23, 2022, arXiv:2203.12692v1, 23 pages.

Lester et al., "The Power of Scale for Parameter-Efficient Prompt Tuning," CoRR, Submitted on Apr. 18, 2021, arXiv:2104.08691v1, 13 pages.

Li et al., "Align before Fuse: Vision and Language Representation Learning with Momentum Distillation," 35h Conference on Neural Information Processing Systems (NeurIPS 2021), 12 pages.

Li et al., "BLIP: Bootstrapping Language-Image Pre-training for Unified Vision-Language Understanding and Generation," CoRR, Submitted on Jan. 28, 2022, arXiv:2201.12086v1, 12 pages.

Li et al., "HERO: Hierarchical Encoder for Video+Language Omni-representation Pre-training," CoRR, Submitted on May 1, 2020, arXiv:2005.00200v1, 14 pages.

Li et al., "Oscar: Object-Semantics Aligned Pre-training for Vision-Language Tasks," European Conference on Computer Vision, 2020, 16 pages.

Li et al., "Prefix-Tuning: Optimizing Continuous Prompts for Generation," CoRR, Submitted on Jan. 1, 2021, arXiv:2101.00190v1, 15 pages.

Lippe et al., "A Multimodal Framework for the Detection of Hateful Memes," CoRR, Submitted on Dec. 23, 2020, arXiv:2012.12871v1, 14 pages.

Liu et al., "Optimization of image description metrics using policy gradient methods," CoRR, Submitted on Dec. 1, 2016, arXiv:1612.00370v1, 10 pages.

Liu et al., "What Makes Good In-Context Examples for GPT-3?," CoRR, Submitted on Jan. 17, 2021, arXiv:2101.06804v1, 12 pages.

Lu et al., "ViLBERT: Pretraining Task-Agnostic Visiolinguistic Representations for Vision-and-Language Tasks," 33rd Conference on Neural Information Processing Systems (NeurIPS 2019), 2019, 11 pages.

Luo et al., "UniViLM: A Unified Video and Language Pre-Training Model for Multimodal Understanding and Generation," CoRR, Submitted on Feb. 15, 2020, arXiv:2002.06353v1, 11 pages.

Luo et al., "VC-GPT: Visual Conditioned GPT for End-to-End Generative Vision-and-Language Pre-training," CoRR, Submitted on Jan. 30, 2022, arXiv:2201v1, 10 pages.

Marino et al., "OK-VQA: A Visual Question Answering Benchmark Requiring External Knowledge," 2019 IEEE/CVF Conference on Computer Vision and Pattern Recognition (CVPR), 2019, pp. 3195-3204.

McCloskey et al., "Catastrophic Interference in Connectionist Networks: The Sequential Learning Problem," Psychology of Learning and Motivation, 1989, vol. 24, pp. 109-165.

Menick et al., "Teaching language models to support answers with verified quotes," CoRR, Submitted on Mar. 21, 2022, arXiv:2203.11147v1, 40 pages.

Miech et al., "End-to-End Learning of Visual Representations from Uncurated Instructional Videos," 2020 IEEE/CVF Conference on Computer Vision and Pattern Recognition (CVPR), 2020, pp. 9879-9889.

Miech et al., "RareAct: A video dataset of unusual interactions," CoRR, Submitted on Aug. 3, 2020, arXiv:2008.01018v1, 6 pages.

Mikolov et al., "Recurrent neural network-based language model," Interspeech, Sep. 20910, pp. 1045-1048.

Min et al., "Rethinking the Role of Demonstrations: What Makes In-Context Learning Work?," CoRR, Submitted on Feb. 25, 2022, arXiv:2202.12837v1, 14 pages.

Mitchell et al., "Model Cards for Model Reporting," Proceedings of the Conference on Fairness, Accountability, and Transparency, Jan. 2019, pp. 220-229.

Mokady et al., "ClipCap: CLIP Prefix for Image Captioning," CoRR, Submitted on Nov. 18, 2021, arXiv:2111.09734v1, 10 pages.

Murahari et al., "Large-scale Pretraining for Visual Dialog: A Simple State-of-the-Art Baseline," European Conference on Computer Vision, 2020, 18 pages.

Perez et al., "Red Teaming Language Models with Language Models," CoRR, Submitted on Feb. 7, 2022, arXiv:2202.03286v1, 31 pages.

Perez et al., "True Few-Shot Learning with Language Models," 35th Conference on Neural Information Processing Systems (NeurIPS 2021), 2021, 17 pages.

Pham et al., "Combined Scaling for Zero-shot Transfer Learning," CoRR, Submitted on Nov. 19, 2021, arXiv:2111.10050v1, 18 pages.

Press et al., "Train Short, Test Long: Attention with Linear Biases Enables Input Length Extrapolation," International Conference on Learning Representations (ICLR 2022), 2022, 25 pages.

Qiao et al., "Winner Team Mia at TextVQA Challenge 2021: Vision-and-Language Representation Learning with Pre-trained Sequence-to-Sequence Model," CoRR, Submitted on Jun. 24, 2021, arXiv:2106.15332v1, 2 pages.

Radford et al., "Learning Transferable Visual Models From Natural Language Supervision," CoRR, Submitted on Feb. 26, 2021, arXiv:2103.00020v1, 48 pages.

Rae et al., "Scaling Language Models: Methods, Analysis & Insights from Training Gopher," CoRR, Submitted on Dec. 8, 2021, arXiv:2112.11446v1, 118 pages.

Raffel et al., "Exploring the Limits of Transfer Learning with a Unified Text-to-Text Transformer," CoRR, Submitted on Oct. 23, 2019, arXiv:1910.10683v1, 52 pages.

Rajbhandari et al., "ZeRO: Memory optimizations Toward Training Trillion Parameter Models," SC20: International Conference for High Performance Computing, Networking, Storage and Analysis, 2020, 16 pages.

Ramesh et al., "Hierarchical Text-Conditional Image Generation with CLIP Latents," CoRR, Submitted on Apr. 13, 2022, arXiv:2204.06125v1, 27 pages.

Rennie et al., "Self-critical Sequence Training for Image Captioning," 2017 IEEE Conference on Computer Vision and Pattern Recognition (CVPR), 2017, Pages pp. 7008-7024.

Requeima et al., "Fast and Flexible Multi-Task Classification Using Conditional Neural Adaptive Processes," 33rd Conference on Neural Information Processing Systems (NeurIPS 2019), 2019, 12 pages.

Reynolds et al., "Prompt Programming for Large Language Models: Beyond the Few-Shot Paradigm," CoRR, Submitted on Feb. 15, 2021, arXiv:2102.07350v1, 10 pages.

Rudinger et al., "Gender Bias in Coreference Resolution," CoRR, Submitted on Apr. 25, 2018, arXiv:1804.09301v1, 7 pages.

Russakovsky et al., "ImageNet Large Scale Visual Recognition Challenge," CoRR, Submitted on Jan. 30, 2015, arXiv:1409.0575v3, 43 pages.

(56) References Cited

OTHER PUBLICATIONS

Sanh et al. "Multitask Prompted Training Enables Zero-Shot Task Generalization," CoRR, Submitted on Mar. 17, 2022, arXiv:2110. 08207v3, 216 pages.

Schuhmann et al., "LAION-400M: Open Dataset of CLIP-Filtered 400 million Image-Text Pairs," CoRR, Submitted on Nov. 3, 2021, arXiv:2111.02114v1, 5 pages.

Schwemmer et al., "Diagnosing Gender Bias in Image Recognition Systems," Socius, Jan.-Dec. 2020, vol. 6, pp. 1-17.

Sharma et al., "Conceptual Captions: A Cleaned, Hypernymed, Image Alt-text Dataset For Automatic Image Captioning," Proceedings of the 6th Annual Meeting of the Association for Computational Linguistics, vol. 1: Long Papers, Jul. 2018, pp. 2556-2565.

Shoeybi et al., "Megatron-LM: Training Multi-Billion Parameter Language Models Using Model Parallelism," CoRR, Submitted on Sep. 17, 2019, arXiv:2104.08691v1, 15 pages.

Singh et al., "FLAVA: A Foundational Language And Vision Alignment Model," CoRR, Submitted on Dec. 8, 2021, arXiv:2112. 04482v1, 17 pages.

Singh et al., "Towards VQA Models That Can Read," 2019 IEEE/ CVF Conference on Computer Vision and Pattern Recognition (CVPR), 2019, pp. 8317-8326.

slideslive.com [online], "Few-shot Classification by Recycling Deep Learning," Invited Talk at the S3D-OLAD Workshop, ICLR, Jul. 3, 2021, retrieved on Jul. 12, 2024, retrieved from URL<https:// slideslive.com/38955350/fewshot-classification-by-recycling-deep-learning>, 3 pages [Video Submission].

Smaira et al., "A Short Note on the Kinetics-700-2020 Human Action Dataset," CoRR, Submitted on Oct. 21, 2020, arXiv:2010. 10864v1, 5 pages.

Snell et al., , "Prototypical Networks for Few-shot Learning," 31st Conference on Neural Information Processing Systems (NIPS 2017), 2017, 11 pages.

So et al., "Primer: Searching for Efficient Transformers for Language Modeling," CoRR, Submitted on Sep. 17, 2021, arXiv:2109. 08668v1, 35 pages.

Strubell et al., "Energy and Policy Considerations for Deep Learning in NLP," CoRR, Submitted on Jun. 5, 2019, arXiv:1906. 02243v1, 6 pages.

Su et al., "VL-BERT: Pre-training of Generic Visual-Linguistic Representations," CoRR, Submitted on Aug. 22, 2019, arXiv:1908. 08530v1, 13 pages.

Sun et al., "VideoBERT: A Joint Model for Video and Language Representation Learning," 2019 IEEE/CVF International Conference on Computer Vision (ICCV), 2019, pp. 7464-7473.

Sutskever et al., "Generating Text with Recurrent Neural Networks," Proceedings of the 28th International Conference on Machine Learning, 2011, 8 pages.

Tan et al., "LXMERT: Learning Cross-Modality Encoder Representations from Transformers," Proceedings of the 2019 Conference on Empirical Methods in Natural Language Processing and the 9th International Joint Conference on Natural Language Processing (EMNLP-IJCNLP), Nov. 2019, pp. 5100-5111.

Thomee et al., "YFCC100M: the new data in multimedia research," Communications of the ACM, Feb. 2016, 59(2):64-73.

Thoppilan et al., "LaMDA: Language Models for Dialog Applications," CoRR, Submitted on Jan. 20, 2022, arXiv:2201.08239v1, 47 pages.

Tian et al., "Rethinking Few-shot Image Classification: A Good Embedding is All You Need?," European Conference on Computer Vision, 2020, pp. 1-17.

Touvron et al., "Fixing the train-test resolution discrepancy," 33rd Conference on Neural Information Processing Systems (NeurIPS 2019), 2019, 11 pages.

Tsimpoukelli et al., "Multimodal Few-Shot Learning with Frozen Language Models," 35th Conference on Neural Information Processing Systems (NeurIPS 2021), 2021, 13 pages.

Vaswani et al., "Attention Is All You Need," 31st Conference on Neural Information Processing Systems (NIPS 2017), 2017, 11 pages.

Vinyals et al., "Matching Networks for One Shot Learning," 30th Conference on Neural Information Processing Systems (NIPS 2016), 2016, 9 pages.

Vinyals et al., "Show and Tell: A Neural Image Caption Generator," International Conference on Computer Vision, 2015, pp. 3156-3164.

Wang et al., "All in One: Exploring Unified Video-Language Pre-training," CoRR, Submitted on Mar. 14, 2022, arXiv:2203. 07303v1, 18 pages.

Wang et al., "SimVLM: Simple Visual Language Model Pretraining with Weak Supervision," CoRR, Submitted on Aug. 24, 2021, arXiv:2108.10904v1, 16 pages.

Wang et al., "UFO: A UniFied Transformer for Vision-Language Representation Learning," CoRR, Submitted on Nov. 19, 2021, arXiv:2111.10023v1, 14 pages.

Wang et al., "Unifying Architectures, Tasks, and Modalities Through a Simple Sequence-to-Sequence Learning Framework," CoRR, Submitted on Feb. 7, 2022, arXiv:2202.03052v1, 23 pages.

Wang et al., "VATEX: A Large-Scale, High-Quality Multilingual Dataset for Video-and-Language Research," International Conference on Computer Vision, 2019, pp. 4581-4591.

Wang et al., "VD-BERT: A Unified Vision and Dialog Transformer with BERT," Proceedings of the 2020 Conference on Empirical Methods in Natural Language Processing (EMNLP), Nov. 2020, pp. 3325-3338.

Wang et al., "What Language Model Architecture and Pretraining Objective Work Best for Zero-Shot Generalization?," CoRR, Submitted on Apr. 12, 2022, arXiv:2204.05832v1, 26 pages.

Wei et al., "Finetuned Language Models Are Zero-Shot Learners," CoRR, Submitted on Sep. 3, 2021, arXiv:2109.01652v1, 46 pages.

Weidinger et al., "Ethical and social risks of harm from Language Models," CoRR, Submitted on Dec. 8, 2021, arXiv:2112.04359v1, 64 pages.

Wortsman et al., "Model soups: averaging weights of multiple fine-tuned models improves accuracy without increasing inference time," CoRR, Submitted on Mar. 10, 2022, arXiv:2203.05482v1, 35 pages.

Wu et al., "STAR: A Benchmark for Situated Reasoning in Real-World Videos," 35th Conference on Neural Information Processing Systems (NeurIPS 2021), 2021, 13 pages.

Xiao et al., "NExT-QA: Next Phase of Question-Answering to Explaining Temporal Actions," IEEE Computer Vision and Pattern Recognition, 2021, pp. 9777-9786.

Xu et al., "Video Question Answering via Gradually Refined Attention over Appearance and Motion," MM '17: Proceedings of the 25th ACM international conference on Multimedia, Oct. 2017, 9 pages.

Xu et al., "VLM: Task-agnostic Video-Language Model Pre-training for Video Understanding," CoRR, Submitted on May 20, 2021, arXiv:2105.09996v1, 13 pages.

Xu et al., "ZeroPrompt: Scaling Prompt-Based Pretraining to 1,000 Tasks Improves Zero-Shot Generalization," CoRR, Submitted on Jan. 18, 2022, arXiv:2201.06910v1, 23 pages.

Yan et al., "Achieving Human Parity on Visual Question Answering," CoRR, Submitted on Nov. 17, 2021, arXiv:2111.08896v1, 27 pages.

Yan et al., "Multiview Transformers for Video Recognition," CoRR, Submitted on Jan. 12, 2022, arXiv:2201.04288v1, 15 pages.

Yang et al., "An Empirical Study of GPT-3 for Few-Shot Knowledge-Based VQA," The Thirty-Sixth AAAI Conference on Artificial Intelligence (AAAI-22), Jun. 2022, pp. 3081-3089.

Yang et al., "Just Ask: Learning to Answer Questions from Millions of Narrated Videos," International Conference on Computer Vision, 2021, pp. 1686-1697.

Yang et al., "TAP: Text-Aware Pre-training for Text-VQA and Text-Caption," IEEE Computer Vision and Pattern Recognition, 2021, pp. 8751-8761.

Yao et al., "FILIP: Fine-grained Interactive Language-Image Pre-Training," CoRR, Submitted on Nov. 9, 2021, arXiv:2111.07783v1, 18 pages.

(56)          References Cited

OTHER PUBLICATIONS

Young et al., "From image descriptions to visual denotations: New similarity metrics for semantic inference over event descriptions," Transactions of the Association for Computational Linguistics, vol. 2, 2014, pp. 67-78.

Yuan et al., "Florence: A New Foundation Model for Computer Vision," CoRR, Submitted on Nov. 22, 2021, arXiv:2111.11432v1, 17 pages.

Zaken et al., "BitFit: Simple Parameter-efficient Fine-tuning for Transformer-based Masked Language-models," CoRR, Submitted on Jun. 18, 2021, arXiv:2106.10199v1, 8 pages.

Zellers et al., "Merlot Reserve: Neural Script Knowledge through Vision and Language and Sound," IEEE Computer Vision and Pattern Recognition, 2022, pp. 16375-16387.

Zellers et al., "Merlot: Multimodal Neural Script Knowledge Models," 35th Conference on Neural Information Processing Systems (NeurIPS 2021), 18 pages.

Zeng et al., "Socratic Models: Composing Zero-Shot Multimodal Reasoning with Language," CoRR, Submitted on Apr. 1, 2022, arXiv:2204.00598v1, 20 pages.

Zhai et al., "LiT: Zero-Shot Transfer with Locked-image Text Tuning," CoRR, Submitted on Nov. 15, 2021, arXiv:2111.07991v1, 19 pages.

Zhai et al., "Scaling Vision Transformers," CoRR, Submitted on Jun. 8, 2021, arXiv:2106.04560v1, 31 pages.

Zhao et al., "Calibrate Before Use: Improving Few-Shot Performance of Language Models," Proceedings of the 38th International Conference on Machine Learning, PMLR 139, 2021, 10 pages.

Zhao et al., "Understanding and Evaluating Racial Biases in Image Captioning," IEEE Computer Vision and Pattern Recognition, 2021, pp. 14830-14840.

Zhou et al., "Towards Automatic Learning of Procedures from Web Instructional Videos," The Thirty-Second AAAI Conference on Artificial Intelligence (AAAI-18), 2018, pp. 7590-7598.

Zhou et al., "Unified Vision-Language Pre-Training for Image Captioning and VQA," The Thirty-Fourth AAAI Conference on Artificial Intelligence (AAAI-20), 2020, pp. 13041-13049.

Zhu et al., "ActBERT: Learning Global-Local Video-Text Representations," IEEE Computer Vision and Pattern Recognition, 2020, pp. 8746-8755.

Zhu et al., "Enhance Multimodal Transformer With External Label And In-Domain Pretrain: Hateful Meme Challenge Winning Solution," CoRR, Submitted on Dec. 15, 2020, arXiv:2012.08290v1, 10 pages.

Zhu et al., "Uni-Perceiver: Pre-training Unified Architecture for Generic Perception for Zero-shot and Few-shot Tasks," CoRR, Submitted on Dec. 2, 2021, arXiv:2112.01522v1, 15 pages.

Zhu et al., "Vatex Video Captioning Challenge 2020: Multi-View Features and Hybrid Reward Strategies for Video Captioning," CoRR, Submitted on Jun. 9, 2020, arXiv:1910.11102v3, 4 pages.

Zintgraf et al., "Fast Context Adaptation via Meta-Learning," Proceedings of the 36th International Conference on Machine Learning, PMLR 97, 2019, 10 pages.

Zohourianshahzadi et al., "Neural attention for image captioning: review of outstanding methods," Artificial Intelligence Review, 2022, available online Nov. 29, 2021, 2022(55):3833-3862.

Office Action in Canadian Appln. No. 3,248,013, Nov. 26, 2025, 4 pages.

Office Action in Australian Appln. No. 2023258672, mailed on Jan. 15, 2026, 4 pages.

Jaegle et al., "Perceiver IO: A General Architecture for Structured Inputs & Outputs," CoRR, submitted on Mar. 15, 2022, arXiv:2107.14795v3, 30 pages.

Office Action in Japanese Appln. No. 2024-563398, mailed on Feb. 17, 2026, 6 pages (with English translation).

* cited by examiner

Output

Output token string

Input token string

61

203        205

62 a very serious cat

71

701        702

900

901

Input each data item of query input into a modality network, to generate one or more compressed representations of each data item

902

Generate prompt input comprising the input token string of the query item

903

Input the prompt input to a data-item-token processing model

1000

1001    Form a data-item-token processing model by interleaving the token processing layers with gated cross-attention layers 1002    Form query processing system comprising modality network and data-item-token processing model 1003    Train modality network and gate cross-attention layers

LANGUAGE MODEL FOR PROCESSING A MULTI-MODE QUERY INPUT

CROSS-REFERENCE TO RELATED APPLICATION

This application claims priority to U.S. Provisional Application No. 63/336,192, filed on Apr. 28, 2022. The disclosure of the prior application is considered part of and is incorporated by reference in the disclosure of this application.

BACKGROUND

This specification relates to a neural network configured to process a multi-mode query input (e.g. a mixture of text and sound/image(s)), to generate an output which is a response to the query input.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Language models employing neural networks are known which, upon receiving an input token string which is a sequence of tokens selected from a token vocabulary (e.g. a piece of text composed of letters selected from an alphabet (e.g. a natural language alphabet), a piece of text composed of subwords or word pieces selected from a corresponding vocabulary, a piece of text composed of phonemes selected from a corresponding vocabulary, and so on), generate an output token string (another sequence of tokens selected from the token vocabulary) which is a sensible response to the input token string, e.g. a plausible continuation of the input token string, or an answer to a question posed by the input token string.

SUMMARY

The present disclosure describes a system (a "query processing system"), implemented as computer programs in one or more computers in one or more locations, which receives a query input comprising an input token string and also at least one data item having a second, different modality.

For example, the data item(s) may be image(s). Each data item may be a still image—e.g. the data item may be pixel values (e.g. red-green-blue (RGB) values) for each pixel of a pixel array. Alternatively, one or more of the data items may be video images—e.g. the data may be, for each of multiple frames, pixel values for each pixel of a respective array. The image(s) may be captured by imaging the real world, by a still or video camera.

In another possibility, the data item(s) may be sound signal(s). A sound signal is audio data representing values of an audio waveform at each of a plurality of times, e.g. the sound captured by a microphone during a period of time.

In a further possibility, the data items may be video images with an accompanying respective soundtrack.

The query processing system is operative to generate an output token string based on the query input. The input token string and output token string are each sequences of tokens, selected from a (single) token vocabulary (e.g. both strings may be strings of letters from the Roman alphabet, strings of subwords or word pieces from a word piece vocabulary, and so on). The token vocabulary may be the token vocabulary of a natural language (e.g. Roman letters in the case of English, or Roman letters plus Roman letters with accents in the case of French).

In general terms, the disclosure suggests that the query processing system extracts the data item(s) from the query input, and inputs them to a modality network which is configured to generate from them one or more corresponding compressed representations of each data item. The query processing system uses the input token string to generate a prompt input for a data-item-token processing model. The data-item-token processing model comprises a stack of processing layers including token processing layers, and gated cross-attention layers interleaved with the token processing layers. The prompt input may be supplied to the first processing layer of the stack. The gated cross-attention layers each receive at least one of the compressed representations, and perform a gating operation based on the received compressed representations. The output token string is the output of the data-item-token processing model.

The output token string is a sensible response to the query input. Specifically, the input token string may at least partly define a question about the content of at least one of the data items in the query input (the "subject data item"), and the output string may be a (correct) response to the question. Thus, the question defines a data item processing task to be carried out on the subject data item.

The query processing system may be regarded as a generalization of a classifier neural network. A classifier neural network typically receives data items, and determines which of a pre-determined plurality of classes the data item belongs to (e.g. if the data item is an image showing an object, the classifier may output data indicating which of a predetermined set of classes the object belongs to). By contrast, in the query processing system, the input token string of the query input determines the processing task which the query processing system should perform on the subject data item to generate an output token string. In other words, the input token string defines (e.g. in natural language) a transform which is applied to the subject data item to generate an appropriate output token string. From another point of view, the input token string defines information which the query processing system is to extract from the subject data item, and the output token string encodes that information.

The input token string may comprise the question (data item processing task) explicitly. For example, in the case that the subject data item is a still image or video, the input token string may be "what activity is shown?".

Alternatively or additionally, the input token string may define the question implicitly, e.g. by giving one or more examples of the data item processing task. That is, the query input may comprise, in addition to the subject data item, one or more "task example" portions. Each task example portion includes a data item and respective section of the input token string which is the answer to the question when the question is asked about the content of the data item in the example portion (i.e. the result of applying the question to that data item).

For instance, each task example portion may be an image and a statement relating to the subject of the image. One possible task example portion would be a photograph of a chinchilla, and a section of the input token string which is the text "This is a chinchilla. They are mainly found in Chile". This task example portion implicitly defines the question as "What animal is shown in the image. In what country is it commonly found?". Note that the question not only results in information about the content of the image, but also information which is not present in the image but which is associated with the content (i.e. the country in which an animal depicted in the subject data item is commonly found).

Thus, the query processing system identifies a data item processing task which, when applied to the data item in the task example portion, results in the section of the input token string in the task example portion, and applies that processing task to the subject data item to generate the output token string. If there are multiple task example portions in the query input, the query processing system identifies a data item processing task which, when applied to the respective data items in the task example portions, results in the respective sections of the input token string in each of the task example portions, and applies that processing task to the subject data item to generate the output token string.

A query input with no task example portions (e.g. a query input which just comprises the subject data item and an input token string which explicitly defines the question) may be referred to as a "zero shot" query input. A query input including (in addition to the subject data item and optionally a part of the input token string which contributes to defining the question, such as an explicit statement of the question) a number n of example portions is referred to as an "n-shot" query input. A "few shot" query input is one for which n is low, e.g. one or two. For example, the query input might consist of the text "Name the artist", then a data item which is a picture of a painting by Picasso, then the word "Picasso", then a subject data item which is a picture of a painting by Salvador Dali. This is a "one-shot" query input because there is one task example portion (the picture of the painting by Picasso and the word "Picasso"). The input token string of the query input is the text "Name the artist Picasso". It comprises a word ("Picasso") which is the section of the input token string which is part of the task example portion.

In the case that the data items are video images, the query processing system may operate as a video processing system that is configured to analyze a sequence of video frames to detect objects in the video frames and provide information relating to the detected objects in response to a question defined by the input token string. The questions may comprise, for example, a request for a prediction of a future event or state relating to one or more of the objects (e.g. "will objects X and Y collide?"), or a request for conditional or counterfactual information relating to one or more of the objects (e.g. "what event would [not] happen if object X is modified, moved or absent?"), or a request for analysis of the video frames to determine a property or characteristic of one or more of the objects (e.g. "how many objects of type Z are moving?").

The response to the question provided as the output token string may, for example, be in the form of a yes/no answer, or may define a probability distribution over a set of possible answers; or the response may define the location of an object. Implementations of the system are flexible in the types of question that can be defined, and a single implementation of the system can handle multiple different types of question. Merely by way of example, the system can be used to predict whether or not two objects will collide, or how this may be avoided. The response to the query may be used by a human or computer system in many ways. For example the analysis may be useful in itself, or it may be used to provide a warning and/or to control motion of one or more of the objects.

The query processing system has a number of other technical applications. For example, it may be used by a person (e.g. a visually-impaired person in the case that the data items are (still or video) images, or a hearing-impaired person in the case that the data items are sound signals) to obtain information about the subject data item. For example, the query processing system may be part of a computer system which obtains the subject data item (e.g. in the form of a still or moving image, using a camera of the computer system). The person can supply the input token string (e.g. by controlling a data input device, or by speaking a command which is converted into the input token string, e.g. a string of letters or tokens representing phonemes). The query processing system can then generate the output token string, e.g. as a string of tokens which are converted into a sound signal which is broadcast to the person by a speaker device. A useful feature of this computer system is its flexibility, since the person may freely define the information which the query processing system should extract from the subject data item.

Optionally, the computer system may be configured to allow the person to generate a series of multiple query inputs, each including the same subject data item but with different input token strings. For example, if the subject data item is an image, and the input token string of a first query input may be "What is shown in the picture?". If the query processing system generates, in response to the first query input, a corresponding output token string (e.g. "A bus"), then the person may be able to define a second query input including the same subject data item and with a new input token string (e.g. "What destination is on the front of the bus?").

Optionally, each query input in the series of query inputs, except the first query input, may include the input token string and the output token string from one or more of the previous query inputs in the series. In this way, the person may engage in a coherent discussion with the query processing system about the subject data item (which is typically included in all the query inputs of the series), in which at each stage the query processing system generates an output token string which is a sensible continuation of the earlier part of the discussion.

Another technical application of the query processing system is a captioning system for a data item which is a video item. The input token string may define the video item processing task as "provide captions for the video explaining what is happening", and in this case the output token string may comprise captions describing events or actions performed in the video. If the data item is a video item with a soundtrack, the captions may comprise a transcription of the soundtrack.

In another application, the query processing system may generate output data that categorizes the data items into one or more of a plurality of categories, e.g. by defining a score for each category of a plurality of possible categories for the data items. As another particular application, where the data items comprise (still or video) images or sounds (audio data describing an audio waveform), the data item processing task (question) may be to provide output data that defines (e.g. as a score) whether the image or video or audio waveform is described by text comprised in the input token string.

In another technical application, the data item is a still or video image comprising text, and the computer system might comprise an OCR (optical character recognition) system for extracting the text from the image to generate at least part of the input token string. For example, if the data item is an image of a scene comprising a sign with instructions (e.g. the image may be an image of a road including a road sign including text), the OCR may generate the input token string based on the instructions in the image. In this case, the output token image may indicate the significance of the instructions, given the rest of the scene (e.g. in the case of a data item which is an image of an empty parking bay and a sign indicating that parking is allowable at the present time, the output token string may be "Please park here"). In another example, the data item may be an image (e.g. a meme) comprising text which is extracted by the OCR to form the input token string, and the output token string may indicate (e.g. as a score) whether the combination of the image and the text is offensive (e.g. indecent, subversive or blasphemous).

In another technical application, the query input may instruct the query processing system to generate, as the output token string, code executable by a processor of a computer system. For example, the query input may read "[Image of a dog] Generate HTML code which when executed generates a video image of this animal moving its body" (here the square brackets denote the data item in the query input, i.e. an image of a dog).

Note that the stack of token processing layers may be operative on their own (i.e. if they are arranged as a stack in the same order, without the interleaved the gated cross-attention layers) to perform a token string processing operation of receiving an input token string and generating from it an output token string. For example, the output token string may be the answer to a question defined by the input token string, or a (sensible) continuation to the sequence of tokens defined by the input token string, e.g. a continuation of a story begun by the input token string.

The token processing layers of the data-item-token processing model may be layers generated by a publicly-known language model training method (e.g. Brown et al, "Language models are few-shot learners", in Conference on Neural Information Processing Systems, 2020). The term "train" is used here to mean that parameters of the token processing layers are iteratively adapted, e.g. based on a training base of examples illustrative of a task the token processing layers are to perform. After the training of the token processing layers, the data-item-token processing model may be formed by interleaving the trained token processing layers with the gated cross-attention layers. The gated cross-attention layers may then be trained, e.g. jointly with the modality network, based on a training database. Here training refers to iteratively modifying variable parameters which define the gated cross-attention layers, and variable parameters which define the modality network (as described below, this may be variable parameters which define a compressed representation generation system which is a component of the modality network). The training is based on a training database of "multi-mode" training examples, as described below. During this training, the token processing layers are preferably "frozen", that is substantially not changed. This means that the amount of data required in the training database is small, e.g. much smaller than a training database used earlier to train the token processing layers.

Optionally, the data items in a given query input may have different respective modalities, e.g. one of the data items may be an audio signal and another may be a (still or moving) image. Optionally, a different modality network may be provided for each respective modality, and data item(s) in the query input having each respective modality are transmitted as inputs to the respective modality network.

Each modality network produces compressed representations of the corresponding received data item(s), and these are transmitted to ones of the gated cross-attention layers. For simplicity, the following discussion considers only the case that data items of one modality are present in the query, and only one modality network, suitable for data items of that modality.

Note that data items which are composed of a video image with an associated sound track may, in some implementations be treated as having a single modality and thus processed as a whole by a single modality network. Alternatively, in other implementations, the video image of each data item may be split from the sound track, thereby generating two respective data items of different respective modalities which are processed by different respective modality networks of the query processing system.

The (or each) modality network may employ a pre-trained encoder network which has been pre-trained (e.g. according to a publicly known method) to generate, upon receiving a data item, an encoded data item. The encoded data item may have a smaller number of components than the data item itself. The encoder network may, for example, comprise one or more stacked convolutional layers, and the encoded data item may be a feature map.

The modality network may comprise the encoder network and a compressed representation generation system arranged to receive the encoded data item and generate an output. The output of the modality network is (or, more generally, is based on) the output of the compressed representation generation system. Using a pre-trained encoder network as part of the modality network, and not changing it substantially (or even at all) during the training of the compressed representation generation system, means that the compressed representation generation system may have fewer parameters than if the encoder network were not present and the compressed representation generation system instead received the raw (unencoded) data items of the training examples. This reduction in parameters in turn means that the training database used to jointly train the modality network (i.e. the compressed representation generation system portion of the modality network) and the gated cross-attention layers does not need as many training examples, and that the training process requires fewer computational resources.

As mentioned above, the compressed representation system and the gated cross-attention layers may be trained jointly using the training database in an iterative process. Here the term, "joint training" means that the iterative changes to the compressed representation generation system are interleaved with, or substantially simultaneous with, corresponding ones of, the iterative changes to the gated cross-attention layers.

The training database is composed of training examples which each comprise at least one data item and a token string ("multi-mode" training examples). The token string is a string of tokens from the same token vocabulary as the input token string. During the training, repeatedly, one of the training examples may be chosen. The data item(s) in the training item are input to the modality network, in order to generate corresponding compressed representations, which are used by the gated cross-attention layers. The token string of the training example is divided into a first portion (representing an earlier part of the token string) and a second portion (representing a later part of the token string). The first portion of the token string part is used to generate a prompt input for the data-item-token processing model. Thus, based on the training example, the data-item-token processing model generates, from the compressed representations and the prompt input, an output token string. The training of the modality network and the gated cross-attention layers are then modified to increase the statistical correlation between the output token string and the second portion of the token string of the training example.

For example, if the token string of the training example is denoted y and the data item(s) of the training item are denoted x, then the modification may be such as to increase $$p(y|x) = \prod_{l=1}^{L} p(y_l|y_{<l}, x_{\leq l}), \qquad (1)$$

where L is the number of characters in the token string of the training example, $y_l$ denotes the l-th character of the token string, $y_{<l}$ denotes the l-1 earlier characters of the token string, $x_{\leq l}$ denotes the data item(s) prior to the l-th character of the token string, and $p(y_l|y_{<l}, x_{\leq l})$ denotes the probability of the data-item-token processing network generating an output token string beginning $y_l$ based on a prompt input which is $y_{<l}$ and the compressed representations generated based on the modality network from the data items $x_{\leq l}$.

In fact, preferably each of the training iterations is performed using plural training examples. For example, the training examples in the training database may be partitioned into groups ("datasets") of training examples in the training database. There may be an integer number M of datasets. The m-th dataset, where m=1, . . . , M, is denoted $D_m$. This is assigned a corresponding scalar weighting $\lambda_m$ which may be the same for all batches, but may alternatively be different for different batches (e.g. lower for batches of training examples taken from sources in which there is a lower correlation between text and images). If all datasets have the same quality, there may be no value in partitioning the training examples (e.g. M may be set to 1). In each training iteration, a respective batch of $B_m$ training examples may be selected randomly from each of the M datasets, and an update is made to the variable parameters of the compressed representation generation system and the gated cross-attention layers, so as to reduce an loss function, indicative of the failure of the data-item-token processing model to predict successive ones of the tokens in the batches of training examples.

For example, the loss function may be the expected negative log-likelihood of the second portion of the token string of the training examples given the first portion, averaged over all possible positions l where the token string of the training example can be divided:

$$\sum_{m=1}^{M} \lambda_m \cdot E_{(x,y) \sim D_m} \left[ -\sum_{l=1}^{L} \log p(y_l|y_{<l}, x_{\leq l}) \right] \qquad (2)$$

where E denotes expectation value. The gradients obtained from Eqn. (2) over all M datasets may be calculated in order to perform an update step to the variable parameters of both the gated cross-attention layers and the compressed representation generation system.

The compressed representation generation system may comprise one or more resampler layers, e.g. arranged as a stack of resampler layers. Each resampler layer receives the output of the encoder network (e.g. following a transformation to the output of the encoder layer, such as a flattening operation) or a preceding layer of the stack. Each of the resampler layers may perform a transformer operation, that is, it includes one or more transformer blocks or self-attention layers. A transformer block typically includes an attention or self-attention neural network layer followed by a feedforward neural network. An attention, or self-attention, neural network layer is a neural network layer that includes an attention, or self-attention, operation (that operates over the attention layer input to generate the attention layer output). A self-attention operation may be masked so that any given position in an input sequence does not attend over any positions after the given position in the input sequence. There are many different possible (self-) attention operations. Some examples of transformer blocks including attention operations, are described in Vaswani et al. "Attention is all you need", 31st Conference on Neural Information Processing Systems (NIPS 2017), Long Beach, CA, USA.

Generally, an attention operation maps a query and a set of key-value pairs to an output, where the query, keys, and values are all vectors. The output is computed as a weighted sum of the values, where the weight assigned to each value is computed by a compatibility function, e.g. a dot product or scaled dot product, of the query with the corresponding key.

In implementations the attention operation is configured to apply a self-attention operation over the attention layer input; this may be followed by one or more feed-forward neural network layers to generate the attention layer output. In general an attention operation determines a relationship between two sequences; a self-attention operation is configured to relate different positions in the same sequence to determine a transformed version of the sequence as an output. For example the attention layer input may comprise a vector for each element of the input sequence. These vectors provide an input to the self-attention operation and are used by the self-attention operation to determine a new representation of the same sequence for the attention layer output, which similarly comprises a vector for each element of the input sequence. An output of the self-attention operation may be used as the attention layer output, or it may be processed by one or more feed-forward layers to provide the attention layer output.

In some implementations the attention operation is configured to apply each of a query transformation e.g. defined by a query matrix $W^Q$, a key transformation e.g. defined by a key matrix $W^K$, and a value transformation e.g. defined by a value matrix $W^V$, to the attention layer input which is the input data X to the attention layer, to derive a respective query vector $Q=XW^Q$, key vector $K=XW^K$, and value vector $V=XW^V$, which are used to determine an attended sequence for the output. For example the attention operation may be a dot product attention operation applied by applying each query vector to each key vector to determine respective weights for each value vector, then combining the value vectors using the respective weights to determine the attention layer output for each element of the input sequence. The attention layer output may be scaled by a scaling factor e.g. by the square root of the dimensions of the queries and keys, to implement scaled dot product attention. Thus, for example, an output of the attention operation may be determined as $$\text{softmax}\left(\frac{QK^T}{\sqrt{d}}\right)V$$

where d is a dimension of the key (and value) vector. In another implementation the attention operation can comprise an "additive attention" mechanism that computes the compatibility function using a feed-forward network with a hidden layer. As previously mentioned, the output of the attention operation may be further processed by one or more fully-connected, feed forward neural network layers.

The attention operation may implement multi-head attention, that is, it may apply multiple different attention operations in parallel. The outputs of these may then be combined, e.g. concatenated, with a learned linear transformation applied to reduce to the original dimensionality if necessary.

Optionally, the first resampler layer of the stack of layers may additionally receive at least one latent vector (a set of input latent values). The components of the latent vector may be among the variable parameters of the compressed representation system which are trained in the training operation. The latent vector may have a number of components which is lower (e.g. much lower) than the number of components of the (e.g. flattened) output of the encoder network. Each resampler layer is trained to generate an output which also have a number of components which is much lower than the number of components of the output of the encoder network, e.g. it may have the same number of components as the layer query vector. The other resampler layer(s) of the stack (if any) receive the output of the preceding resampler layer in the stack.

Each resampler layer may receive (i) the (e.g. flattened) output of the encoder network, and (ii) a "latent input" which is the output of the preceding layer of the preceding resampler layer in the stack, or, in in the case of the first resampler layer of the stack, the latent vector. The resampler layer may generate (for each of one or more heads) a key vector, a value vector and a query vector, from different corresponding one(s) of the data inputs (i) and (ii) (in principle, any combination of data inputs (i) and (ii) may be used; at least one of the key vector, value vector and query vector is based on (i.e. derived from data comprising) each of data inputs (i) and (ii), and preferably at least one of the key vector, value vector and query vector is based on both data inputs (i) and (ii)), as described above, using the matrices $W^Q$, $W^K$, and $W^V$. For example, the key vector and value vector may be generated by multiplying the data input (i) (or a concatenation of the data input (i) and the data input (ii)) respectively with the matrices $W^K$, and $W^V$, and the query vector may be generated by multiplying the data input (ii) with the matrix $W^Q$. Then the output of the resampler layer is generated as explained above based on the key vector, value vector and query vector, e.g. as $$\text{softmax}\left(\frac{QK^T}{\sqrt{d}}\right)V.$$

Here d is the number of components of the key vector. The components of matrices $W^Q$, $W^K$, and $W^V$ may be among the variable parameters of the compressed representation generation system which are trained in the training process.

The output of the stack of resampler layers may be passed to an adaptive system which is a single or multi-layer perceptron, which generates the compressed representation which is the output of the compressed representation generation system. Indeed, optionally, an adaptive system, such as a single or multi-layer perceptron may be provided within each of the resampler layer(s), to receive the output of the corresponding attention operation of the resampler layer. In either case, the perceptron may be a substantially fully-connected ("dense") network. The perceptron has variable parameters which are among the variable parameters of the compressed representation generation system which are trained in the training process.

The use of a modality network including one or more resampler layers as described above for generating compressed representations of data item(s) constitutes an independent aspect of the disclosure.

Another independent aspect of the disclosure is the use of such resampler layers within a system for generating an output token string based on a query input comprising an input token string and one or more data items, the input token string and output token string being strings of tokens selected from a token vocabulary, and the data items being of a modality other than tokens selected from the token vocabulary. The method comprises generating one or more compressed representations of each data item by processing the data item using the modality network, generating a prompt input comprising the input token string of the query input, and inputting the prompt input and the compressed representation of each data item to a data-item-token processing model configured to generate the output token string based on the prompt input and the compressed representation of each data item.

Turning to the gated cross-attention layers, each gated cross-attention layer may pass on data it receives from the preceding processing layer of the data-item-token network (or, in the case that the gated cross-attention layer is the first processing layer of the data-item-token network (though usually the first layer of the data-item-token network will be one of the token processing layers), the prompt input) plus a modification (interaction term) having a magnitude which is positively dependent on the value of a gating parameter (gating value), i.e. the magnitude of the interaction term increases with an increasing value of the gating parameter. The interaction term is added component-wise to the input of the gated cross-attention layer. For example, the output of the gated cross-attention layer, upon receiving a (vector) input y from the preceding processing layer, may be y+tanh (αx) where a is the gating parameter (a scalar), x is the (vector) output of an adaptive system (described below) which receives y, and tanh is a component-wise tanh operation applied separately to each component of αx.

If the value of the gating parameter is low, then the influence of the data items in the query inputs is correspondingly low. At the start of the training, the value of the gating parameter may be chosen to be low (e.g. 0.01) so that the gated cross-attention layers do not much interfere with the operation of the trained token processing layers of the data-item-token processing network. During the training, as the gated cross-attention layers gradually learn to cooperate with token processing layers, the value of the gating parameter is gradually increased.

"Masking" may be applied to at least one (or all) of the gated cross-attention layers. This means that instead of the adaptive system of the gated cross-attention layer generating the interaction terms based on the compressed representations of all the data items of the query input, and data derived from all the prompt input, the interaction term is generated based on compressed representations of only a (proper) subset of the data items in query input and data based on only (proper) sub-set of the prompt input.

For example, suppose the query input comprises (or consist of) a plurality of (non-overlapping) portions which each include exactly one of data items and may also include a plurality of the tokens of the input tokens string. For example, each portion may be one of the input data items and the tokens of the input token string after that data item and up to the next data item, or in the case of a portion for which that data item is the last data item of the query input, up to the end of the input token string. For example, some of the portions may be "task example" portions discussed earlier and/or one of the portions may include the subject data item. For example the query input might be "[image of a cat] This is a cat [Image of a dog] This". A first portion of the query input is "[Image of a cat] This is a cat" (this portion is a task example portion; [Image of a cat] denotes an image of a cat), and a second portion of the query input is "[Image of a dog] This" (where [Image of a dog] is the subject data item, i.e. an image of a dog). For each portion, the modality network generates at least one respective compressed representation of the corresponding data item as described above. In the case of masking, one or more of the gated cross-attention layers may be associated with each of the portions. For a given portion, the one or more associated gated cross-attention layers generate the interaction term based only on the compressed representation of the data item of the associated portion (i.e. not using the compressed representations of other data items of the query input), and without employing data generated based on tokens of the input token string other than within the associated portion (i.e. only using tokens included in the part of the input token string which are within the associated portion).

Note that since masking may apply only to the interaction term, it does not prevent information about the whole of the prompt input flowing through the data-item-token processing model, so that all the token processing layers have access to this information.

The adaptive system of the gated cross-attention layer may comprise a cross-transformer operation and/or processing by a (single or multi-layer) perceptron. For example, the output of the cross-transformer operation may be the input to the perceptron, which outputs the value denoted x above.

The cross-transformer operation is based on (for each of one or more heads) a set matrices $W^Q$, $W^K$, and $W^V$ for each gated cross-attention layer. The components of matrices $W^Q$, $W^K$, and $W^V$, and the variable parameters of the perceptron of the gated cross-attention layer (if any), are (or are at least among) the variable parameters of the gated cross-attention layer which are trained in the training process.

The cross-transformer operation may receive (i) one or more of the compressed representations of the data items in the query input, and (ii) the output of the preceding processing layer, or, in in the case that the gated cross-attention layer is the first processing layer of the stack, the prompt input. The cross-transformer operation may generate (for each of one or more heads) a key vector, a value vector and a query vector, from different ones of the data inputs (i) and (ii), as described above, using the matrices $W^Q$, $W^K$, and $W^V$. For example, the key vector and value vector may be generated by multiplying the data input (i) respectively with the matrices $W^K$, and $W^V$, and the query vector may be generated by multiplying the data input (ii) with the matrix $W^Q$. Then the output of the cross-transformer operation is generated as explained above based on the key vector, value vector and query vector, e.g. as $$\text{softmax}\left(\frac{QK^T}{\sqrt{d}}\right)V,$$

where d is the number of components of the key vector.

As noted above, the prompt input comprises the input token string. It may also comprise "markers" (one or tokens, e.g. tokens contained in the same vocabulary as the input token string) indicating the existence and optionally location of the data items within the query input. For example, if the query input is "[image of a cat] This is a cat [Image of a dog] This", where "[image of a cat]" is a data item which is an image of a cat, and "[Image of a dog]" is a data item which is an image of a dog, the prompt input may be "<image> This is a cat marker <image>", where "<image>" (i.e. those 7 ASCII characters, ASCII being the token vocabulary of the input token string in this case) is the marker which indicates a data item.

A technical effect of the present disclosure is to make possible the provision of a query processing system which has been demonstrated experimentally to provide an accurate way of processing multi-mode query inputs (i.e. ones composed both of tokens and data items of another, different modality). The accuracy has been demonstrated to be high even compared to known computer systems which have been designed for specific multi-mode query processing tasks. It is high even for zero-shot query inputs, and becomes higher for few-shot query inputs.

Additionally, because embodiments of the invention may employ existing token processing layers and encoder networks, the amount of training data which is required to train them, and the computing resources required, are much reduced. The token processing layers (which may include billions of variable parameters) may be trained based on known text databases, and the encoder network may be trained based on known image databases, and only a relatively small training database of multi-mode training examples is required to train the gated cross-attention layers and modality network.

BRIEF DESCRIPTION OF THE DRAWINGS

Examples of the invention will now be described, for the sake of illustration only, with reference to the following drawings.

Like reference numerals denote the same items in different ones of the figures.

DETAILED DESCRIPTION

This specification describes a query processing system which is operative to receive a query input including at least an input token string (a series of tokens selected from a vocabulary) and at least one data item having a different modality from the input token string. The data item typically does not comprise tokens selected from the vocabulary. The query processing system is an example of a neural network system which can be implemented by one or more computer systems in one or more locations.

The data items may comprise one or more images (e.g. still or video image(s) captured by a camera) and/or audio data representing values of an audio waveform at each of a plurality of times, e.g. the sound captured by a microphone during a period of time. The query processing system includes a portion ("a modality network") including an encoder network for encoding the data items (e.g. as a set of features), and a compressed representation generation system for generating a compressed representation of the data item from the encoded data item. For example, in the case of a data item comprising images, the encoder network may be configured to apply at least one 2-dimensional convolutional layer to each image. In the case of a data item comprising audio-data the encoder network may be configured to apply a one-dimensional convolution to the audio data.

Figure 1A:
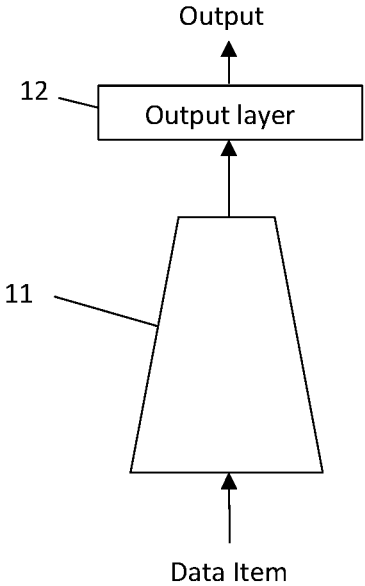
FIG. 1A shows an encoder network.

The encoder network may be one which has been pre-trained within a different neural network system. For example, FIG. 1A illustrates a neural network system including an encoder network 11 and an optional output layer 12. The encoder network 11 receives a data item and generates an output from it. The optional output layer 12 (if present) receives the output of the encoder network 11 and generates an output of the neural network system. The encoder network 11 may be trained using a database of data items and corresponding desired outputs, such that, upon a data item being input to the encoder network 11, the encoder network 11 and (if present) output layer 12 generate the corresponding desired output. During the training process, the output layer 12 (if present) may optionally be trained also. In the case that an output layer 12 is present, the encoder network may be trained to extract features of a data item it receives, and the output layer 12 processes those features to generate the desired output (encoded data item). Following the training the output layer 12 (if any) may be discarded. The encoded data item may have a smaller number of components than the data item from which it is generated. The encoder network 11 may comprise one or more stacked convolutional layers, and the encoded data item may be a (e.g. two-dimensional) feature map.

In the experiments reported below, the encoder network 11 employed was the "f6" model taken from the paper "High-Performance Large-Scale Image Recognition Without Normalization", by A. Brock et al 2021. The encoder network 11 was pre-trained using a contrastive objective on datasets of image and text pairs, using the two-term contrastive loss from "Learning Transferable Visual Models From Natural Language Supervision", by A. Radford et al, 2021. The output of the final stage, a 2D spatial grid of features, was "flattened" to form a 1D sequence.

Figure 1B:
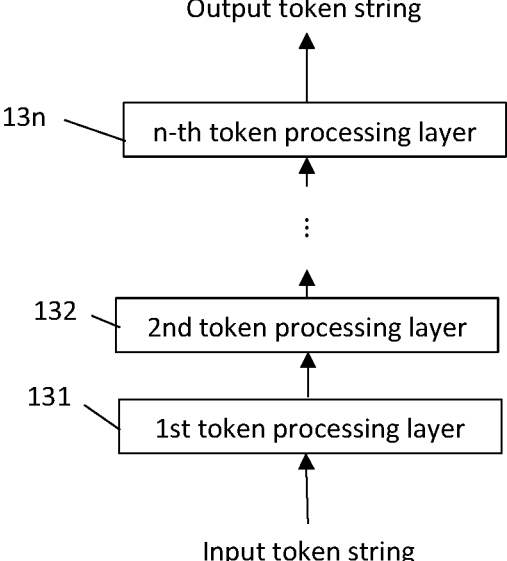
FIG. 1B shows a token processing model.

The query processing system further includes a data-item-token processing model comprising token processing layers taken from a token processing model. The token processing model may be one which has been pre-trained. For example, FIG. 1B illustrates a suitable token processing model comprising an integer number n of token processing layers 131, 132, ... 13n, arranged in a stack (sequence). The first token processing layer receives an input token string. Each token processing layer, except the first, receives the output of the preceding token processing layer. The output of the n-th token processing layer is an output token string of the token processing model. The token processing layers may constitute a "language model" (e.g. a "large language model"), trained on a large database of data, e.g. natural language data, such that upon an input token string (sequence of tokens from the vocabulary) being input to the first token processing layer, the output token string is an appropriate response. For example, if the input token string is a question, the output token string may be an appropriate answer. In the experiments reported below, the token processing model was the Chinchilla model of "Training compute-optimal large language models", J. Hoffmann et al, 2022. Alternatively, the token processing layers may be layers generated by another publicly-known language model training method (e.g. Brown et al, "Language models are few-shot learners", in Conference on Neural Information Processing Systems, 2020).

Figure 2:
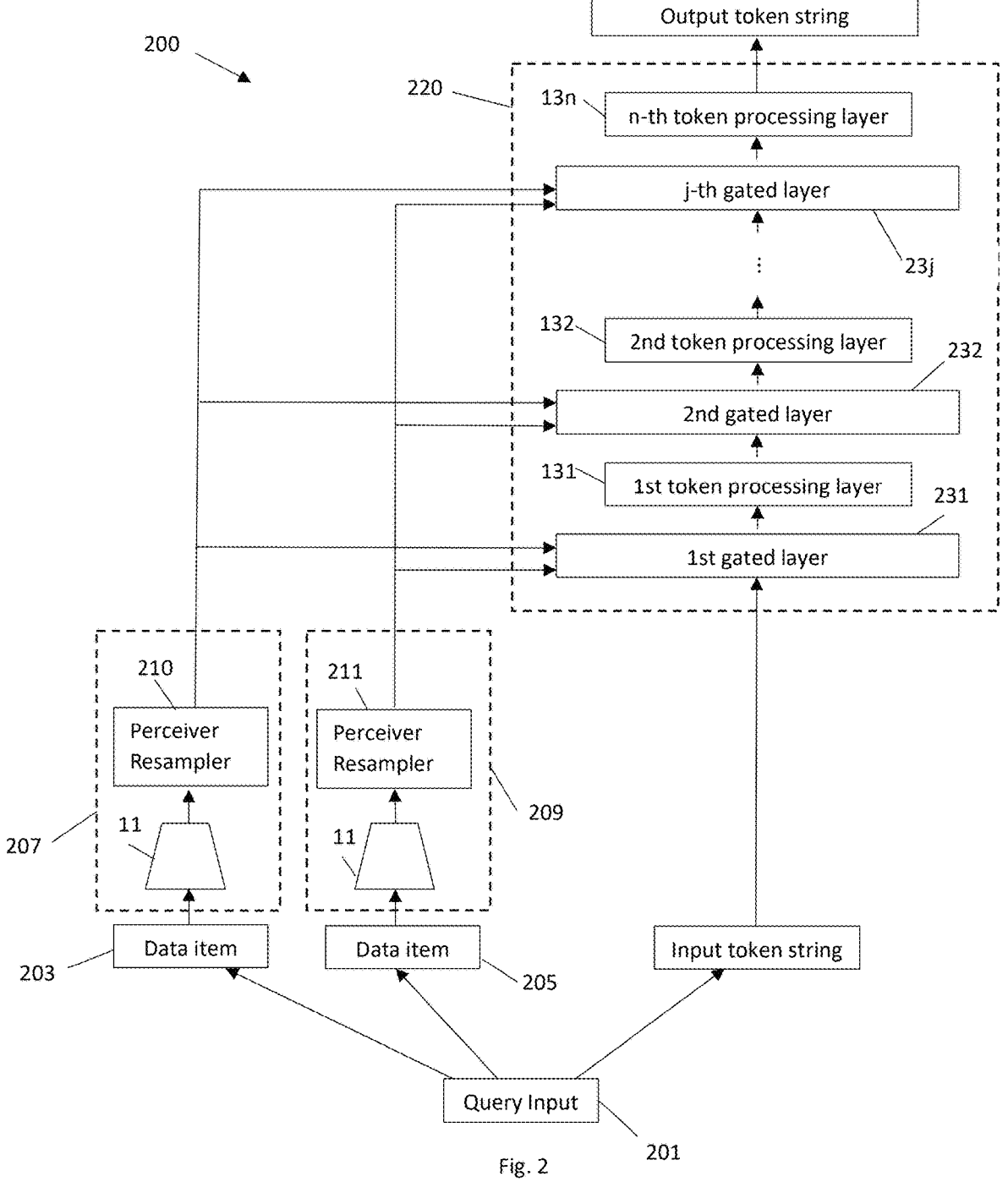
FIG. 2 shows a query processing system comprising modality networks including the encoder network shown in FIG. 1A, and a data-item-token processing model including the token processing model shown in FIG. 1B.

Turning to FIG. 2, the structure of the query processing system 200 is illustrated. The query processing system 200 is configured to receive as an input a query input 201 which includes one or more data items and an input token string. In one case, illustrated in FIG. 2, the query input 201 may contain two data items 203, 205. However, it is to be understood that there may be any number of data item(s).

The query processing system 200 extracts the two data items 203, 205 from the query input 201, and processes each data item using a modality network. As illustrated in FIG. 2, the query processing system contains two modality networks 207, 209, but alternatively, in the case that all data items have the same modality, there may be only a single modality network which in turn receives the data items 203, 205, and generates a corresponding output from each.

Note that if there are multiple data items in the query input 201, and if they have different corresponding modalities, a modality network may be provided for each corresponding modality, and each modality network is configured to receive the data item(s) of the corresponding modality (e.g. sequentially if there are multiple data items of the corresponding modality in the query input). For example, the modality network 207 may be configured to receive data item(s) of the query input which are a single image (e.g. still image), and the modality network 209 may be configured to receive data item(s) of the query input which are audio data. In another example, the modality network 207 may be configured to receive data items of the query input which are a single image (e.g. a still image), and the modality network 209 may be configured to receive data items which are a video (i.e. sequence of images) optionally with a soundtrack of audio data. There may be any desired number of modality networks for each corresponding data item modality which the query processing system 200 is configured to process.

Each modality network 207, 209 is configured to generate, from each data item it receives, one or more corresponding compressed representations of the data item. Each modality network may comprise a pre-trained encoder network 11 (e.g. trained within the system of FIG. 1A), and a compressed representation generation system in the form of a respective resampler 210, 211. Each resampler 210, 211 may, for example, be a "perceiver" as described in "Perceiver: General Perception with iterative attention", A. Jaegle et al, 2021. Alternatively, the resampler 210, 211 may be as described below with reference to FIG. 3 and FIG. 4.

The resamplers 210, 211 take as input a variable number of image, video or audio features produced by the corresponding encoder network 11 from a data item, and produce a compressed representation of the data item having a fixed number of outputs (e.g. visual outputs).

Figure 3:
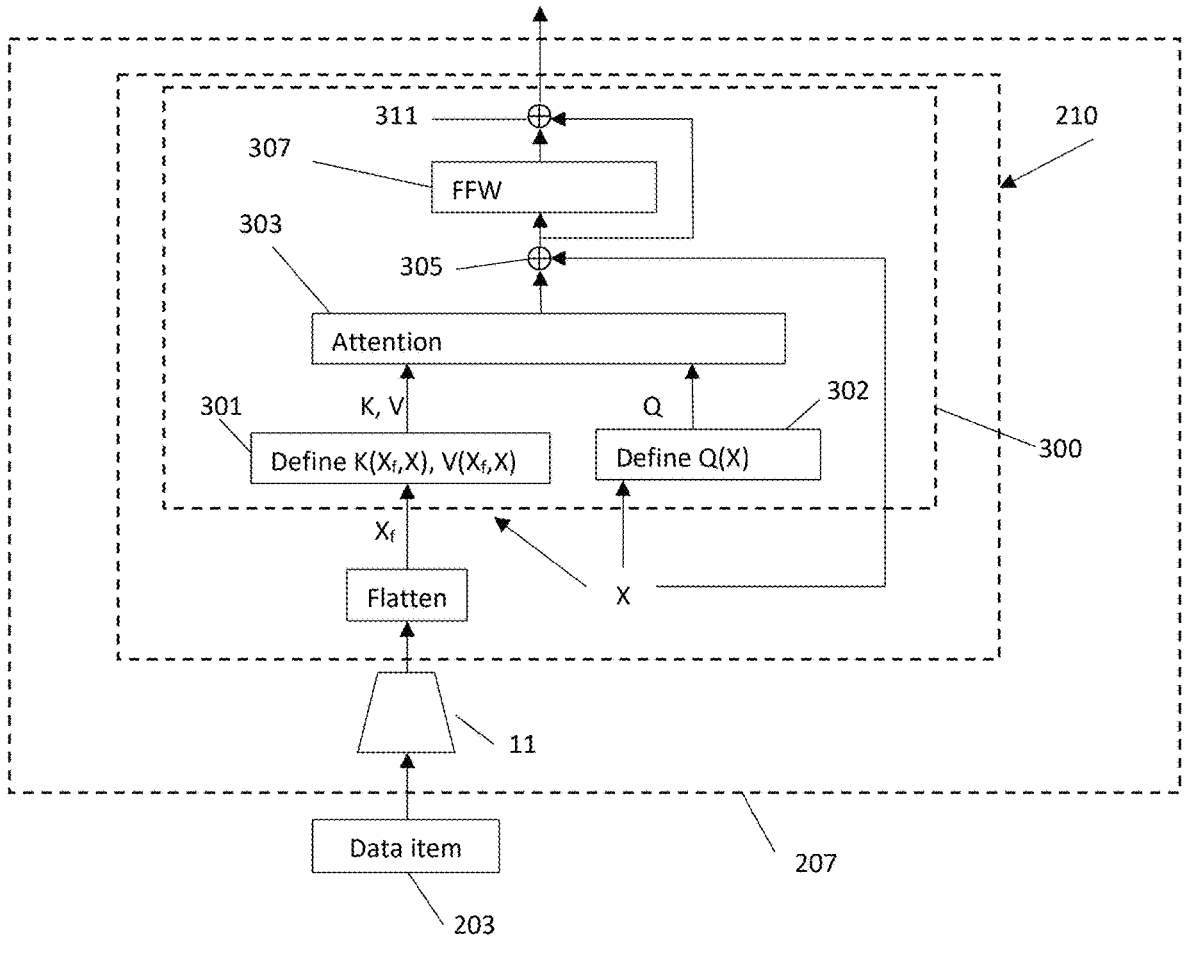
FIG. 3 shows a first modality network.

FIG. 3 shows the structure of a possible modality network 207 in the case that the data item 203 is an image, including a respective "perceiver" resampler 210. Note that the modality network 209 has the same structure if the data item 205 is an image (indeed, as mentioned above, when data items 203, 205 have the same modality, a single network may play the roles of both the modality networks 207, 209).

The resampler 210 receives the output of the encoder 11 (an encoded version of the data item 203), and generates from it generates flattened data denoted $X_f$. The perceiver resampler also receives a predefined number of latent vectors (i.e. sets of latent values), each denoted X, which are learnt (trained) during the training of the modality network 207 described below.

The resampler 210 also includes one or more "resampler layers" 300. For simplicity, the resampler 210 is shown in FIG. 3 as having a single resampler layer 300. The compressed representation generation system may alternatively comprise a plurality of resampler layers, each having the structure illustrated as 300 in FIG. 3. The resampler layers 300 may be arranged as a stack of resampler layers, in which each layer has the same form as the resampler layer 300 shown in FIG. 3. Each resampler layer 300 (except the first) receives the output of the preceding resampler layer of the stack.

The resampler layer 300 (or, if there are multiple resampler layers 300, each resampler layer of the stack) receives the output of the corresponding encoder network 11, e.g. following a transformation to the output of the encoder network 11, such as a flattening operation (i.e. conversion of an e.g. 2-dimensional array, to a 1-D sequence).

Each of the resampler layer(s) 300 may perform a transformer operation as defined above; that is, it includes one or more transformer blocks or self-attention layers. For this purpose it may comprise a unit 301 which uses the flattened data $X_f$ and, by turns, different ones of the latent vectors X, to generate a key vector $K(X_f, X)$ and a value vector $V(X_f, X)$. This process uses a key matrix and a value matrix as described above. A unit 302 uses the latent vector X and a value matrix to generate a query vector Q(X). An attention unit 303 combines K, V and Q by the attention operation described above. The result is added to the latent vector X by an addition unit 305. The result is passed to an adaptive unit, such as a multi-layer feedforward (FFW) perceptron 307. The output of the FFW perceptron 307 is added to the output of the addition unit 305 by a further addition unit 311. The result is an output vector for each of the latent vectors X, providing different respective compressed representations of the data item. The output of each resampler layer 300 may have the same dimensionality as the dimensionality of the latent variables X. This dimensionality may be much lower than the dimensionality of the encoder network 11.

Figure 4:
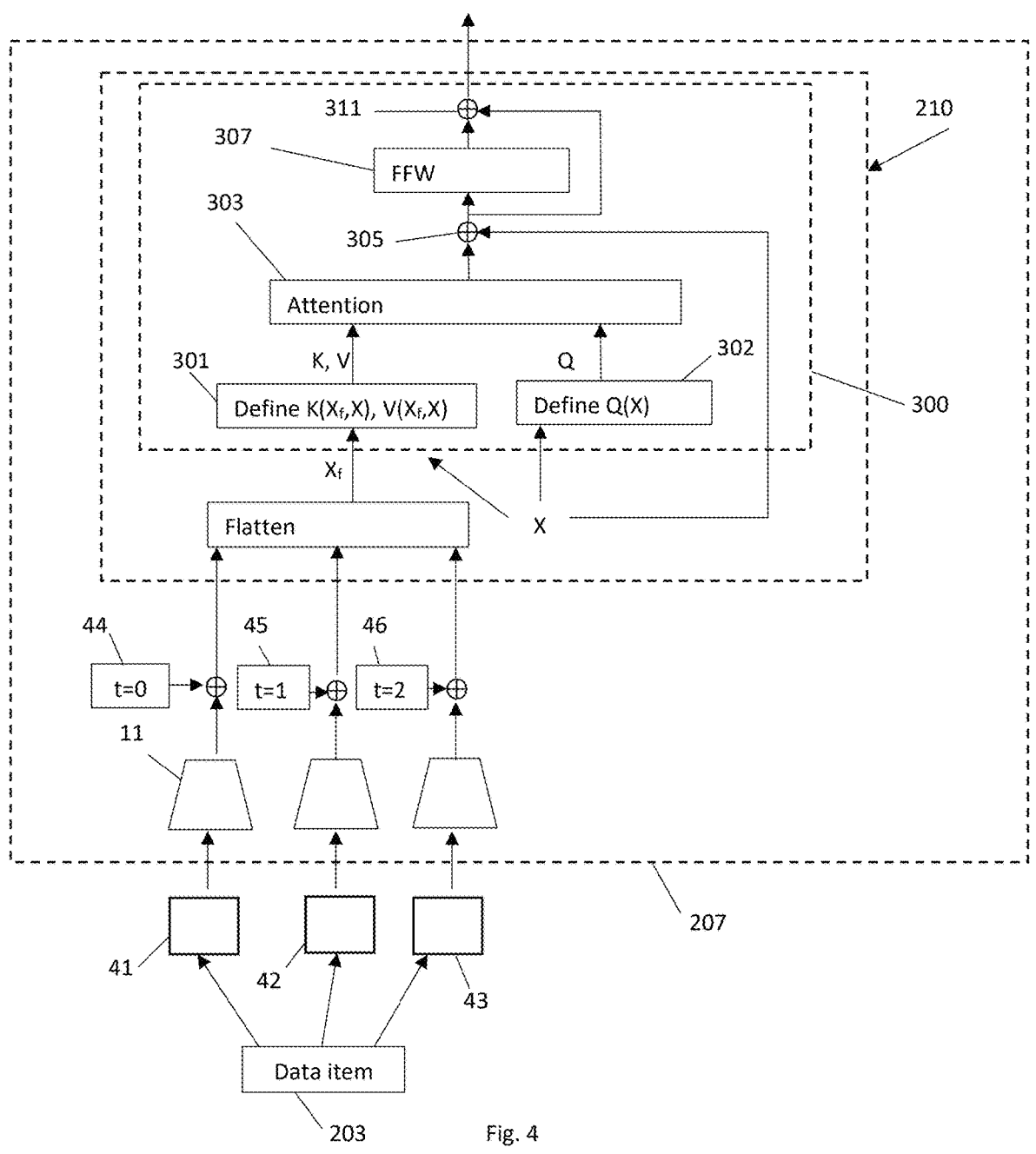
FIG. 4 shows a second modality network.

FIG. 4 shows a variation of the structure of FIG. 3 in the case that the input data item 203 is a plurality of video frames. The data item 203 is split into individual frames 41, 42, 43. Each of these frames is encoded sequentially by the encoder network 11, to generate a corresponding encoded frame. Respective data 44, 45, 46 is added to each of the encoded frames, specifying the position of the frame in data item 203. The resulting data is input to the resampler 210, which may have the same structure as explained above with reference to FIG. 3. Note that although the input to the resampler 210 is different from in FIG. 3, the output, for a given latent vector X, is the same number of output tokens.

The operation of a perceiver resampler may be represented by the following pseudocode:

Let x_f represent the outputs of the corresponding encoder network(s) 11. This is an array with dimensionality [T, S, d], where T is an integer variable representing a number of times (i.e. the number of encoder networks 11, or the number of times a single encoder network is used), S is an integer representing a number of spatial positions, and d is a further integer indicating a number of feature values for each position.

Let x represent R learned latent variables, so this is array with dimensionality [R, d].

The number of layers of the resampler is denoted num_layers.

First, the time embeddings are added and the result flattened:

$$x\_f = x\_f + \text{time\_embeddings}$$

$$x\_f = \text{flatten}(x\_f) \text{This produces an array of dimension } [T*S, d]$$

Then, for each integer value i in the range 1 to num_layers:

$$x = x + \text{attention}\_i(q = x, kv = \text{concatenation}([x\_f, x]))$$

$$x = x + \text{ffw}\_i(x).$$

Here attention_i represents the attention unit 303 performed by the i-th resampler layer 300, based on the corresponding key, value and query matrices, and ffw_i represents the operation performed by the corresponding perceptron 307 of the i-th resampler layer 300.

Thus, the resampler 210 maps a variable size grid of spatial visual features (spatio-temporal features in the case of FIG. 4), to a fixed number of output tokens, independently from the input image resolution of the number of input video frames. Each resampler 210 has a set of learned latent vectors as queries and the keys and values are a concatentation of the visual features with the learned latent vectors.

Returning to FIG. 2, the query processing system 200 further includes a data-item-token processing model 220. This comprises a stack of layers, which are the token processing layers 131, 132, . . . , 13n of the token processing model of FIG. 1B, interleaved by a number j of gated cross-attention layers 231, 232, . . . , 23j. The number j of gated cross-attention layers may be equal to the number n of token processing layers, but in variations n and j may be different from each other, e.g. such that there may be any number of token processing layers between any given pair of gate cross-attention layers.

The outputs from the resamplers 210, 211 are used as control inputs to the gated cross-attention layers. Optionally, the same outputs from the resamplers 210, 211 can be used as control inputs for all the gated layers 231, 232, . . . 23j. This was implemented in some successful experiments, in which 64 latent vectors were used, and 6 resampler layers, and the corresponding 64 vectors output by the perceiver resamplers 210, 211 were used together as the control inputs for all the gated cross-attention layers. However, this is not the only possibility. For example, there may be corresponding different (learned) latent vectors to generate respective control inputs for corresponding ones of the gated cross-attention layers.

The input token string is used as a prompt input for the data-item-token processing model 220, and is supplied to the first processing layer of the stack, which may be the 1st gated cross-attention layer 231. Data passes (upwardly in FIG. 2) through the data-item-token processing model 220, to produce an output token string, which is the output of the data-item-token processing model 220.

The gated cross-attention layers 231, 232, . . . , 23j each receive at least one of the compressed representations from the modality networks 207, 209, and perform a gating operation based on the received compressed representations.

Figure 5:
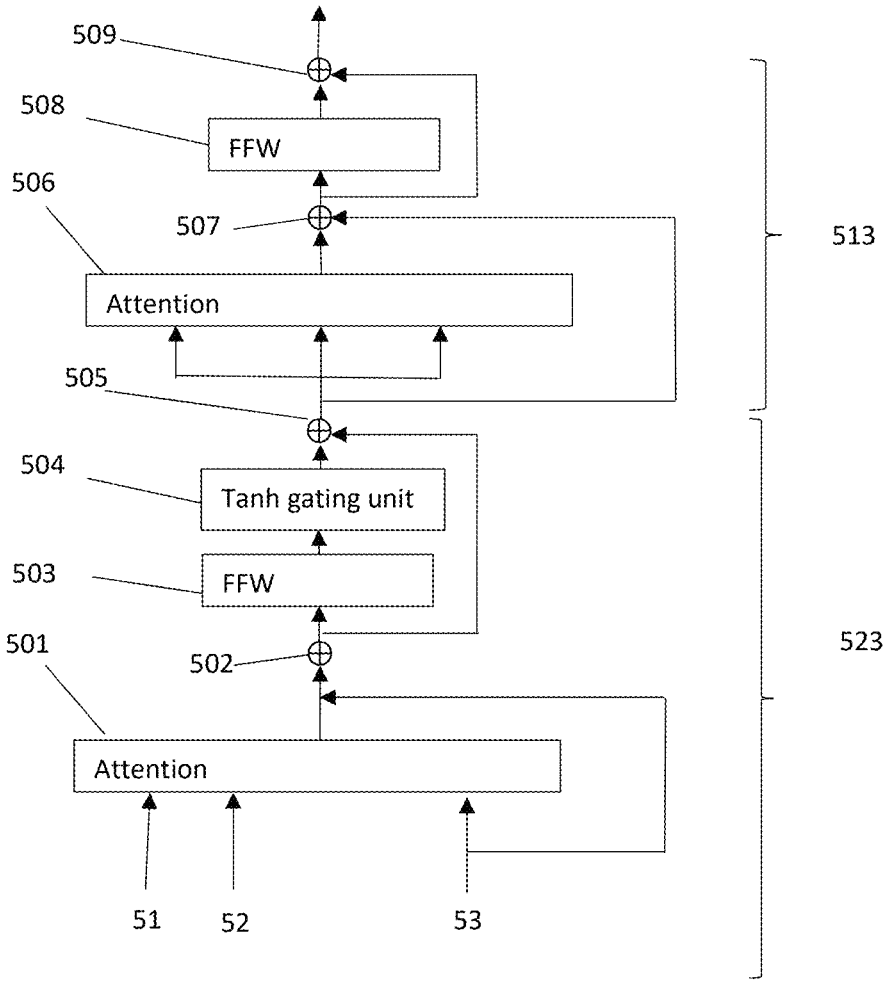
FIG. 5 shows a pair of layers of the data-item-token processing model of the query processing system of FIG. 2.

FIG. 5 shows the structure of two consecutive layers 523, 513 of the data-item-processing model 220 of FIG. 2. The layer 523 is a gated cross-attention layer which is one of the layers 231, 232, . . . , 23j. The layer 513 is one of the token processing layers 131, 132, . . . , 13n.

The gated cross-attention layer 523 receives vision inputs 51, 52 (compressed representations) from respective ones of the modality networks 207, 209. It further receives a vector which is a language input 53, and which may be denoted y. If the gated cross-attention layer 523 is the first layer of the stack, the language input 53 is typically the input token string (prompt input), or a part of it. Otherwise the language input 53 to the gated cross-attention layer 523 is the output from a preceding layer of data-item-token processing model 220.

The gated cross-attention layer 523 applies an attention function 501 as described above, in which the vision inputs 51, 52 may define key and value vectors, and a query vector is defined based on the language input 53. The output of the attention function 501 is added to the language input 53 by the addition unit 502. The result is then input to a FFW network 503, such as a multi-layer perceptron. The output of the FFW network 503 is a vector which may be denoted x. This is input to a tanh gating unit 504 which applies a component-wise operation in which each component is multiplied by a gating parameter $\alpha$, and a tanh function is applied to the result. The output of the FFW network 504 is added to its input by the addition unit 505. This produces the output of the gated cross-attention layer 523, which may be written as y+tanh ($\alpha x$).

The token processing layer 513, as in some known systems, includes a self-attention layer 506. The attention layer operates on key vector, value vector and query vectors generated from the input to the token processing layer 513. The output of the self-attention layer 506 is added to its input by an addition unit 507, and the result is fed to a feedforward (e.g. multi-layer perceptron) layer 508. The output of the FFW network 508 is added to the input of the FFW network 508 by the addition unit 509. This produces the output of the token processing layer 513.

Note that if the gating parameter $\alpha$ is near zero, the output of the gated cross-attention layer 523 is very close to the language input 53, so the query processing system 200 performs almost the same function as the trained token processing model shown in FIG. 1B. However, in use (i.e. after the query processing system 200 has been trained) the value of the gating parameter is significantly higher than zero, so that the compressed representations (e.g. vision inputs) 51, 52 affect the output of the token processing layer 513.

Figure 6:
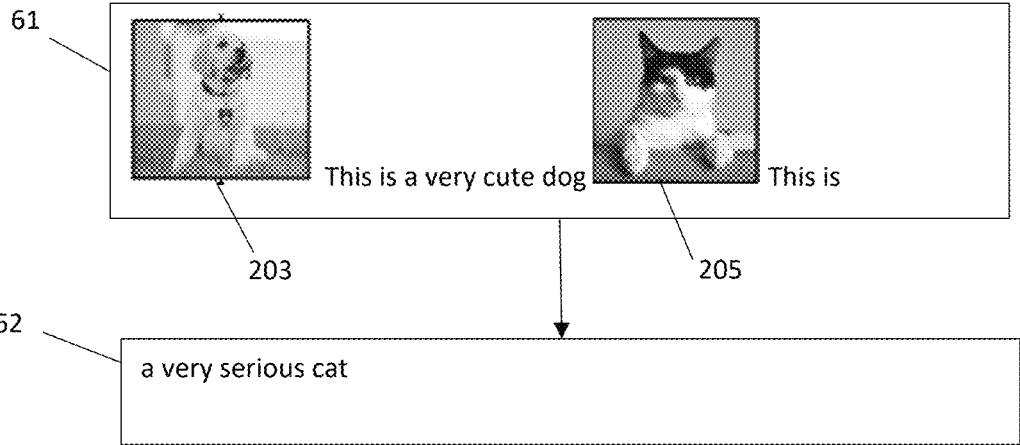
FIG. 6 shows a query input to query processing system, and an output token string generated by the query processing system from the query input.

A typical operation of the trained query processing system 200 is shown in FIG. 6. The query input 61 includes two data items 203, 205 which are in the form of still images: respectively still images of a cat and a dog. As explained above, the data items 203, 205 are input to respective modality networks 207, 209, or input successively to the same modality network, to produce corresponding compressed representations of the data items 203, 205. As the data items 203, 205 are in the form of still images, the query processing system 200 uses modality network(s) in the form illustrated in FIG. 3. If the data items had been videos, the modality network(s) can be the form illustrated in FIG. 4.

The words of the query input 61 are used to generate an input token string for a query input of the query processing system 200. Optionally, the query input may contain one or more "markers", e.g. for each data item 203, 205 of the query input 61 to indicate the existence of the associated data item. For example, the input token string may be the following ASCII characters: "<image> This is a very cute dog. <image> This is". Optionally, additional markers can be provided. For example, a marker (e.g. <EOC>, meaning "end of chunk") can be added prior to any image and at the end of the query input. The markers can be formed of strings of tokens from the vocabulary, or tokens from outside the vocabulary.

The query processing system 200 processes the input token string by passing it through the layers 231, 131, 232, 132, . . . 23j, 13n in turn, where the gated layers 231, 232, . . . , 23j are controlled based on the vision inputs generated by the modality networks 207, 209 based on the corresponding data items 203, 205, i.e. the two still images of the query input 61. In this way, the query processing system 200 generates an output token string, such as the output token string 62 of FIG. 6. The output token string is a string of ASCII characters reading "a very serious cat". This is a logical, grammatical continuation of the query input 61. The first image 203 and the associated text "This is a very cute dog" constitute a "task example". The output token string is the result of performing the task exemplified by the task example to the second data item 205 (the "subject data item").

Methods to train a query processing system, such as the query processing system 200 of FIG. 2, will now be considered. The methods can be implemented by one or more computer systems in one or more locations. As explained above, the encoder network 11 and the token processing layers 131, 132, . . . , 13n may be pre-trained as part of the systems of FIGS. 1A and 1B. The encoder network 11 and token processing layers 131, 132, . . . 13n are not additionally trained during the training of the other layers of the query processing system 200. This means that the amount of data required in the training database is small, e.g. much smaller than a training database used earlier to train the token processing layers and/or the encoder network(s).

Figure 7:
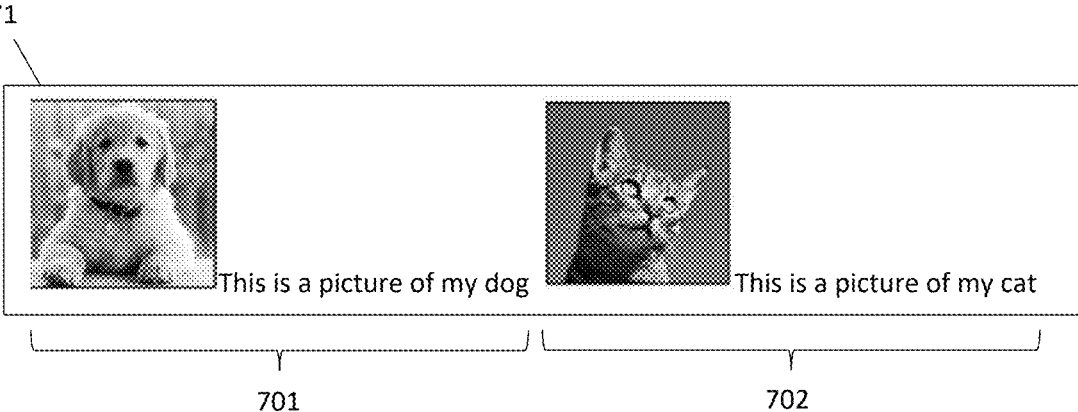
FIG. 7 shows a training example used to train the query processing system.

The training is based on a training database of "multi-mode" training examples. FIG. 7 shows a training example 71. This optionally contains one or more task examples. A single task example 701 is shown, including a data item (photo of a dog) and text relating to the data item ("This is a picture of my dog"). Different ones of the training examples may include different numbers of task examples, or no task examples. The training example 71 further contains a portion 702 which is a data item (photo of a cat) and text relating to the data item ("This is a picture of my cat"). If the training example contains task examples, the text of the portion 702 has the same semantic relationship to the data item of the portion 702 as the text of (each of) the training example(s) has to the data item of that training example.

Figure 8:
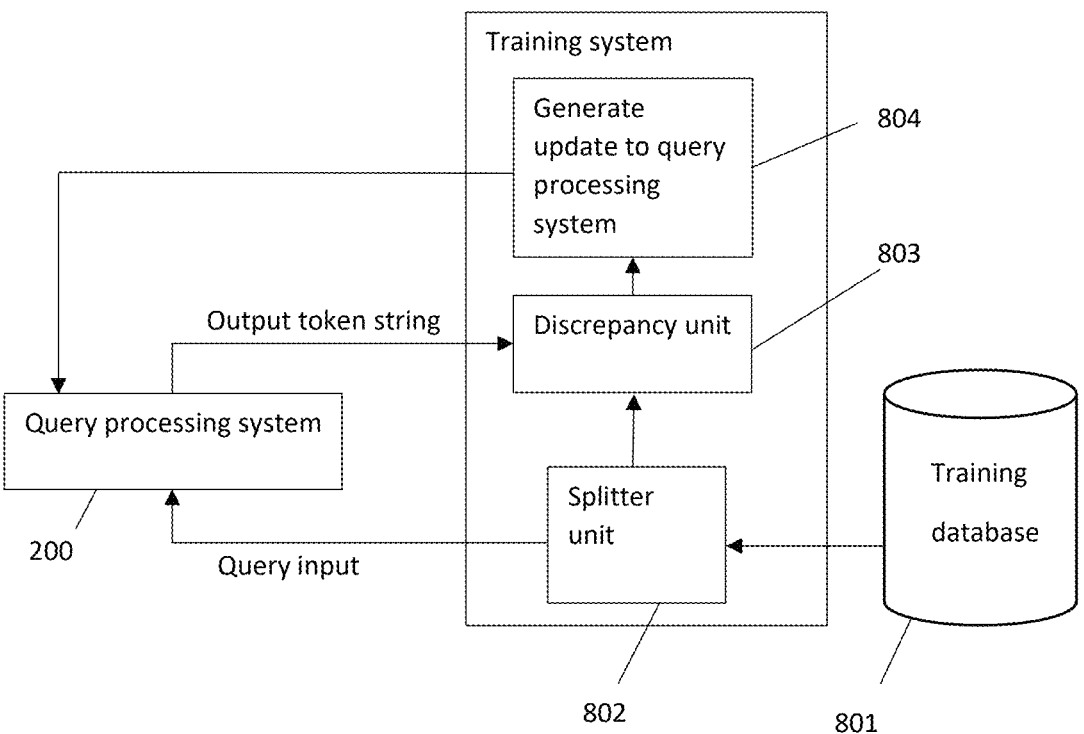
FIG. 8 shows a training system for training a query processing system based on training examples.

The modality network(s) 207, 209, and the gated cross-attention layers 231, 232, . . . 23j may be trained jointly in the system shown in FIG. 8. The system employs a training database 801 composed of training examples, such as the training example shown in FIG. 7, which each comprise at least one data item and a token string ("multi-mode" training examples).

During the training, a series of training iterations are performed. In each iteration, one or more of the training examples may be chosen. In a typical realization, multiple training examples are chosen and treated as a batch, but for simplicity the case of a single training example being selected is discussed here. A spitter unit 802 receives the selected training example, and divides the token string of the selected training example into a first portion, which is an earlier part of the token string, and a second portion, which is a later part of the token string. The data item(s) of the selected training example and the first portion of the token string of the selected training example, together constitute a query input for the query processing system 200. The data item(s) are input to the modality network(s) 207, 209 of the query processing system 200, and the first portion of the token string is used to generate a prompt input for the data-item-token processing model 220 of the query processing system 200. Thus, based on the selected training example, the data-item-token processing model 220 generates, from the compressed representations generated by the modality network(s), and from the prompt input, an output token string.

A discrepancy unit 803 receives the second portion of the token string of the selected training example from the splitter unit, and the output token string, and works out a measure of the discrepancy (difference between them).

An update unit 804 then generates an update to the query processing system 200—that is to the modality network(s) and the gated cross-attention layer(s)—which increases the statistical correlation between the output token string and the second portion of the token string of the training example. The process may be repeated for different choices of the position in the token string of the selected training example at which the splitter unit 802 splits the token string into the first and second portion, and the update generated by the update unit 804 may be such as to decrease the discrepancy for multiple ones of these choices, e.g. an average over the choices.

For example, if the token string of the training example is denoted y and the data item(s) of the training item are denoted x, then the modification may be such as to increase $$p(y|x) = \prod_{l=1}^{L} p(y_l|y_{<l}, x_{\leq l}),$$

where L is the number of characters in the token string of the training example, $y_l$ denotes the l-th character of the token string, $y_{<l}$ denotes the l-1 earlier characters of the token string, $x_{\leq l}$ denotes the data item(s) prior to the l-th character of the token string, and $p(y_l|y_{<l}, x_{\leq l})$ denotes the probability of the data-item-token processing network generating an output token string beginning $y_l$ based on a prompt input which is $y_{<l}$ and the compressed representations generated based on the modality network from the data items $x_{\leq l}$.

In fact, as noted above, preferably each of the training iterations is performed using plural training examples. For example, the training examples in the training database may be partitioned into groups ("datasets") of training examples in the training database. There may be integer number M of datasets. The m-th dataset, where m=1, . . . , M, is denoted $D_m$. This is assigned a corresponding scalar weighting $\lambda_m$ which may be the same for all batches, but may alternatively be different for different batches (e.g. lower for batches of training examples taken from sources in which there is a lower correlation between text and images). If all datasets have the same quality, there may be no value in partitioning the training examples (e.g. M may be set to 1). In each training iteration, a respective batch of $B_m$ training examples may be selected randomly from each of the M datasets, and an update is made to the variable parameters of the compressed representation generation system and the gated cross-attention layers, so as to reduce an loss function, indicative of the failure of the data-item-token processing model to predict successive ones of the tokens in the batches of training examples.

For example, the loss function may be the expected negative log-likelihood of the second portion of the token string of the training examples given the first portion, averaged over all possible positions l where the token string of the training example can be divided:

$$\sum_{m=1}^{M} \lambda_m \cdot E_{(x,y)\sim D_m}\left[-\sum_{l=1}^{L}\log p(y_l|y_{<l}, x_{\leq l})\right]$$

where E denotes expectation value. Gradients of the loss function may be calculated over all M datasets in order to perform an update step to the variable parameters of both the gated cross-attention layers and the modality network(s).

Initially, during the training procedure, the value of the gating parameter $\alpha$ may be chosen to be low (e.g. 0.01), so that the influence of the data items on the output token string is correspondingly low. Thus, at the start of the training the gated cross-attention layers do not much interfere with the operation of the trained token processing layers 231, 232, . . . 23j of the data-item-token processing network 220. During the training, as the gated cross-attention layers gradually learn to cooperate with token processing layers, the value of the gating parameter $\alpha$ is gradually increased, e.g. to $\alpha=1$.

Preferably, in both training and operation, "masking" is applied to at least one (or all) of the gated cross-attention layers 231, 232, . . . 23j. This means that instead of the gated cross-attention layer generating the interaction terms based on the compressed representations of all the data items of the query input, and data derived from all the prompt input, the interaction term is generated based on compressed representations of only a (proper) subset of the data items in query input and only a (proper) sub-set of the prompt input. For example, the query input may comprise (or consist of) a plurality of (non-overlapping) portions which each include exactly one of data items and may also include a plurality of the tokens of the input tokens string. For example, some of the portion(s) may be "task example" portions discussed earlier and/or one of the portions may include the subject data item. For each portion, the modality network generates at least one respective compressed representation of the corresponding data item as described above. In the case of masking, one or more of the gated cross-attention layers may be associated with each of the portions. For a given portion, the one or more associated gated cross-attention layers generate the interaction term based only on the compressed representation of the data item of the associated portion (i.e. not using the compressed representations of other data items of the query input), and without employing data generated based on tokens of the input token string other than within the associated portion (i.e. only using tokens included in the part of the input token string which are within the associated portion). Note that since masking preferably applies only to the interaction term, it does not prevent information about the whole of the prompt input flowing through the data-item-token processing model, so that all the token processing layers have access to this information.

Figure 9:
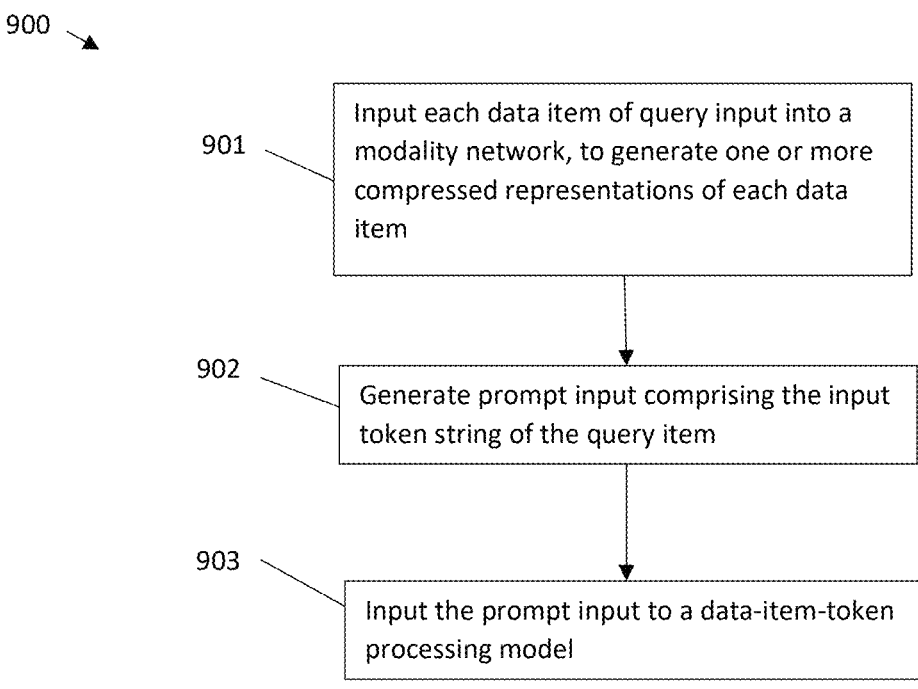
FIG. 9 shows a method of generating an output token string based on a query input.

Turning to FIG. 9, a method 900 which is an example of the present disclosure is shown. The method may be performed by one or more computers in one or more locations. The method 900 is performed by a query processing system, such as the query processing system 200 of FIG. 2. The method is performed on a query input having one or more data items and an input token string.

In step 901, each data item of a query input (such as the query input 61 of FIG. 6) is input into a corresponding modality network, to generate one or more compressed representations of each data item. If the data items have different modalities, then there is typically at least one modality network for the data item(s) of each modality. For a given data item modality, there may be one or more modality networks used for data items of that modality.

In step 902, the input token string is used to generate a prompt input. This may include inserting into the prompt input at least one marker for at least one data item of the query input.

In step 903, the prompt input is processed using a data-item-token processing model, such as the data-item-token processing model 220 of FIG. 2, which also receives the compressed representations generated in step 901, to control gating layers of the data-item-processing model. The output of the data-item-processing model is an output token string, such as the output token string 62 of FIG. 6.

Figure 10:
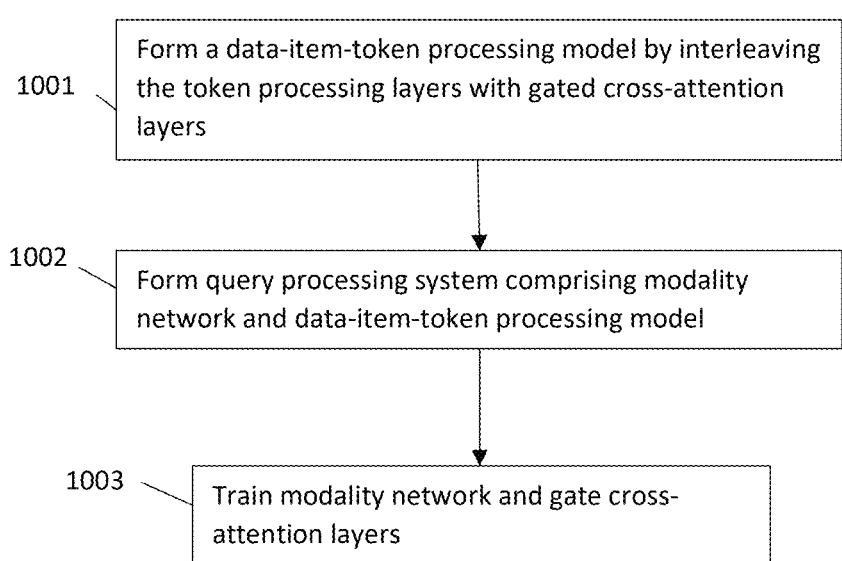
FIG. 10 shows a method of training a query processing system.

Turning to FIG. 10, a method 1000 which is an example of the present disclosure is shown. The method may be performed by one or more computers in one or more locations. The method 1000 generates a query processing system, such as the query processing system 200 of FIG. 2.

In step 1001, token processing layers of a trained language model, such as the model shown in FIG. 1B, are used to form a data-item-token processing model, such as the data-item-token processing model 220 of FIG. 2, by interleaving the token processing layers 131, 132, 13$n$ (trained in a system such as that of FIG. 1B) with untrained gated cross-attention layers 231, 232, 23$j$.

In step 1002, a query processing system, such as the query processing system 200, is formed, using the data-item-token processing model formed in step 1001 and modality network(s), such as the modality networks 207, 209. The modality networks employ trained encoder network(s) 11, and (e.g. untrained) resamplers 210, 211.

In step 1003, the resamplers 210, 211 and the gated layers 231, 232, . . . 23$j$ are jointly trained, such as by the system shown in FIG. 8. Training the resamplers 210, 211 and the gated layers 231, 232, . . . 23$j$ includes training the corresponding key, value and query matrices. Training the resamplers 210 further includes training the latent vectors.

Figure 11:
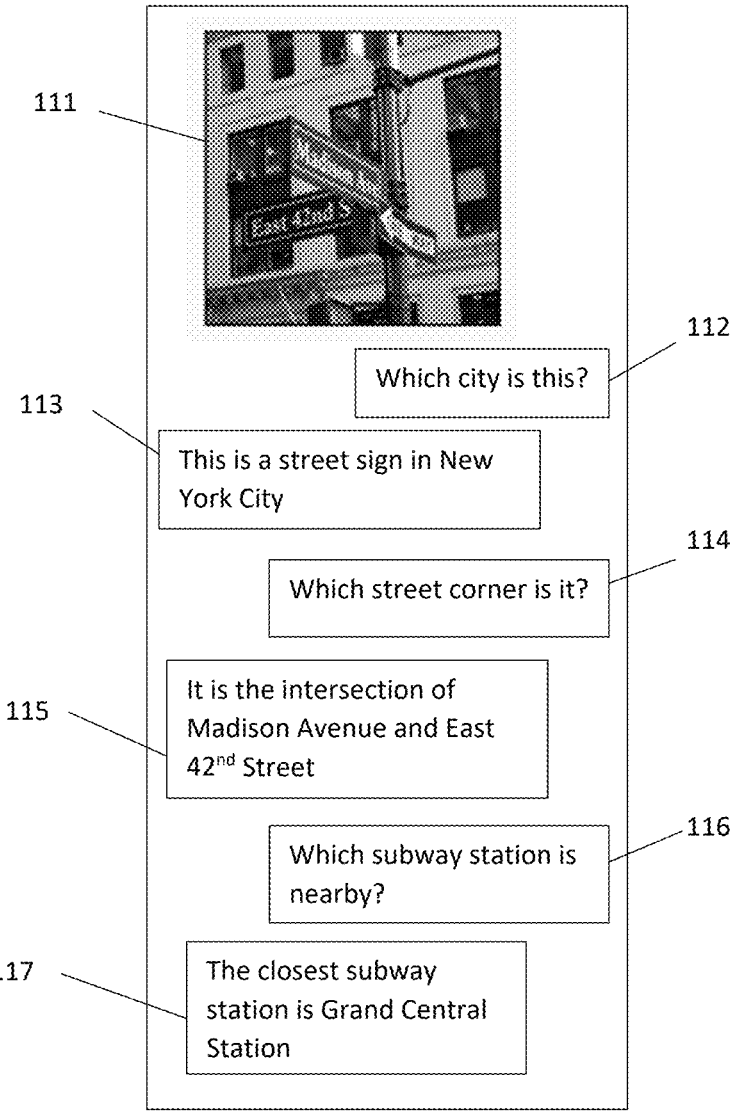
FIG. 11 illustrates a process of interacting with a query processing system.

Experiments were conducted using the query processing system 200 of FIG. 2, demonstrating its ability to perform diverse and challenging tasks. For example, FIG. 11 illustrates a dialogue between a human user and an implementation of the present system. The query processing system was based on a large language model, i.e. token processing system such as shown in FIG. 1B, which was the Chinchilla model of J. Hoffmann et al, implemented with 80 billion variable parameters.

Initially, the user generated a query input containing the data item 111 (a still image) and an input token string 112 (the words "Which city is this?").

The query processing system processed the query input to generate an output token string 113 (the words "This is a street sign in New York").

The user then generated a new query input containing the data item 111, the input token string 112, the output token string 113, and a new input token string 114. The new input token string consists of the words "Which street corner it is?".

The query processing system processed the new query input to generate a new output token string 115 (the words "It is the intersection of Madison Avenue and East 42$^{nd}$ Street").

Thus, a dialogue was carried out between the human user and the query processing system, in which the human user obtained successive information based on the data item of the initial query input. This dialogue could be continued in a series of additional steps, with the user at each step concatenating the data item 111, the input token strings and corresponding generated output strings of any previous step(s), and a new token input string, to generate a new query input, which is input to the query processing system.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "stack" of layers refers to a sequence of layers, each of which receives a data input and produces a data output. Each of the other layers other than the first layer receives as at least part of its input, at least a part of the output of the preceding layer in the sequence. Thus, data flows through the stack from the first layer to the last layer of the sequence, and the output of the stack of layers comprises the output of the last layer of the sequence.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by an apparatus and can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of training a query processing system, the query processing system being for generating an output token string based on a query input comprising an input token string and one or more data items, the input token string and output token string being strings of tokens selected from a token vocabulary, and the data items being of a modality other than tokens selected from the token vocabulary, the method employing a token processing model comprising a stack of token processing layers, the stack of token processing layer being configured to receive input token strings and to generate corresponding output token strings, and a database of training examples, each training example comprising at least one data item and at least one token string;

the method comprising:

forming a data-item-token processing model by interleaving token processing layers from a token processing model with gated cross-attention layers, the data-item-token processing model being configured to generate an output token string upon receiving a prompt input which is a token string, the token processing model comprising a stack of the token processing layers, the stack of token processing layers being configured to receive input token strings and to generate corresponding output token strings, and a database of training examples, each training example comprising at least one data item and at least one token string;

forming the query processing system, the query processing system comprising:

(a) a modality network configured to receive the data items of the query input, to generate one or more compressed representations of each data item; and (b) the data-item-token processing model, the data-item-token processing model being configured to receive a prompt input comprising the input token string of the query input, and each gated cross-attention layer being arranged to receive at least one of the compressed representations; and using the training database, training:

the modality network, and the plurality of gated cross-attention layers.

2. The computer-implemented method of claim 1 in which the training trains the query processing system, upon an encoder of the modality network receiving the at least one data item of any of the training examples, and the data-item-token processing model receiving a prompt input comprising a first portion of the token string of the training example, to generate an output of the query processing system which is positively statistically correlated with a subsequent portion of the token string of the training example.

3. The computer-implemented method of claim 1 in which the modality network comprises:

an encoder configured to encode a data item received by the encoder to generate an encoded data item, and a compressed representation generation system arranged to receive the encoded data item and generate an output, the output of the modality network being based on the output of the compressed representation generation system.

4. The computer-implemented method of claim 3, in which the encoder has been trained to encode a data item received by the encoder to generate an encoded data item, and the training of the modality network and the plurality of gated cross-attention layers comprises training the compressed representation generation system without further training the encoder.

5. The computer-implemented method of claim 3, in which the compressed representation generation system comprises a stack of one or more resampler layers, each resampler layer being adapted to perform an attention operation which employs a key vector, a value vector and a query vector, a subset of the key vector, value vector and query vector being based on the encoded data item, and the remainder of the key vector, value vector and query vector being based on either an output of the preceding one of the resampler layers or, in the case of the first resampler layer of the stack, a set of input latent values, the output of the modality network being based on an output of the last resampler layer of the stack of resampler layers.

6. The computer-implemented method of claim 5 in which the key vector and value vector of each resampler layer are based on the encoded data item and a latent input which is either the output of the preceding one of the resampler layers or, in the case of the first resampler layer of the stack, the set of input latent values, and the query vector is based on the latent input.

7. The computer-implemented method of claim 5 in which each resampler layer further comprises a perceptron arranged to receive the output of the attention operation, and to generate an output, the output of the modality network being based on the output of the perceptron of the last resampler layer of the stack.

8. The computer-implemented method of claim 1, in which the prompt input further comprises one or more corresponding marker items for each data item in the query input, the one or more marker items being indicative of the presence of the data item in the query input.

9. The computer-implemented method of claim 8 in which a position of each marker item in the prompt input is indicative of a position of the corresponding data item in the query input.

10. The computer-implemented method of claim 1 in which each gated cross-attention layer generates its output as a component-wise sum of:

a first input which is the output of the preceding processing layer in the stack of processing layers or, in the case that the gated cross-attention layer is the first processing layer of the stack of processing layers, the prompt input, and an interaction term based on the output of the compressed representation generation system received by the gated cross-attention layer, and at least part of the first input to the gated cross-attention layer.

11. The computer-implemented method of claim 10, in which the interaction term has a magnitude which depends positively upon the value of a gating parameter, the training comprising incrementally increasing the learning parameter.

12. The computer-implemented method of claim 10 which includes, in the case of a query input comprising a plurality of portions, each portion comprising one of the data items, for each portion:

the modality network generating at least one respective compressed representation of the corresponding data item, and at least one of the gated cross-attention layers generating the interaction term based only on the compressed representation of the corresponding data item and without employing data generated based on tokens of the input token string other than within the portion.

13. The computer-implemented method of claim 1 in which each gated cross-attention layer comprises a cross-attention layer, which employs a key vector, a value vector and a query vector, a subset of the key vector, value vector and query vector being based on the at least one compressed representation received by the gated cross-attention layer, and the remainder of the key vector, value vector and query vector being based on the output of the preceding processing layer in the stack of processing layers or, in the case that the gated cross-attention layer is the first processing layer of the stack of processing layers, based on the prompt input.

14. The computer-implemented method of claim 13 in which the key vector and value vector of each gated cross-attention layer are obtained based on the at least one compressed representation received by the gated cross-attention layer, and the query vector of each gated cross-attention layer is based on the output of the preceding processing layer in the stack of processing layers or, in the case that the gated cross-attention layer is the first processing layer of the stack of processing layers, based on the prompt input.

15. The computer-implemented method of claim 13 in which the gated cross-attention layer further comprises a perceptron which receives the output of the cross-attention layer, the output of the gated cross-attention layer being based on an output of the perceptron.

16. A computer-implemented method of generating an output token string based on a query input comprising an input token string and one or more data items, the input token string and output token string being strings of tokens selected from a token vocabulary, and the data items being of a modality other than tokens selected from the token vocabulary, the method comprising:

(a) generating one or more compressed representations of each data item by processing the data item using a modality network which comprises:

an encoder configured to encode the data item to generate an encoded data item, and a compressed representation generation system arranged to receive the encoded data item and generate an output, wherein the compressed representation generation system comprises a stack of one or more resampler layers, each resampler layer being configured to perform an attention operation which employs a key vector, a value vector and a query vector, the key vector, value vector and query vector each being based on at least one of the encoded data item and a latent input which is either an output of the preceding one of the resampler layers or, in the case of the first resampler layer of the stack, a set of input latent values, at least one of the key vector, value vector and query vector being based on both the encoded data item and the latent input, the output of the modality network being based on an output of the last resampler layer of the stack of resampler layers;

(b) generating a prompt input comprising the input token string of the query input; and (c) inputting the prompt input and the compressed representation of each data item to a data-item-token processing model configured to generate the output token string based on the prompt input and the compressed representation of each data item.

17. The computer-implemented method of claim 16 in which the output token string is the response to a query about the content of a subject data item which is one of the data items in the query input, the query being defined based on the input token string.

18. The computer-implemented method of claim 17 in which the query input comprises, in addition to the subject data item, one or more task example portions which each include a respective data item and a respective section of the input token string, and for each task example portion the respective section of the input token string is the response to the query when the query is about the content of the respective data item.

19. The computer-implemented method of claim 17, wherein the query input is a question and the response to the query is an answer to the question.

20. The computer-implemented method of claim 16 in which the token vocabulary comprises the symbols of a natural language writing system.

21. A system comprising one or more processors and one or more storage devices storing instructions that when executed by the one or more processors cause the one or more processors to perform operations for generating an output token string based on a query input comprising an input token string and one or more data items, the input token string and output token string being strings of tokens selected from a token vocabulary, and the data items being of a modality other than tokens selected from the token vocabulary, the operations comprising:

(a) generating one or more compressed representations of each data item by processing the data item using a modality network which comprises:

an encoder configured to encode the data item to generate an encoded data item, and a compressed representation generation system arranged to receive the encoded data item and generate an output, wherein the compressed representation generation system comprises a stack of one or more resampler layers, each resampler layer being configured to perform an attention operation which employs a key vector, a value vector and a query vector, the key vector, value vector and query vector each being based on at least one of the encoded data item and a latent input which is either an output of the preceding one of the resampler layers or, in the case of the first resampler layer of the stack, a set of input latent values, at least one of the key vector, value vector and query vector being based on both the encoded data item and the latent input, the output of the modality network being based on an output of the last resampler layer of the stack of resampler layers;

(b) generating a prompt input comprising the input token string of the query input; and (c) inputting the prompt input and the compressed representation of each data item to a data-item-token processing model configured to generate the output token string based on the prompt input and the compressed representation of each data item.

22. The system of claim 21 in which the output token string is the response to a query about the content of a subject data item which is one of the data items in the query input, the query being defined based on the input token string.

23. The system of claim 21 in which the query input comprises, in addition to the subject data item, one or more task example portions which each include a respective data item and a respective section of the input token string, and for each task example portion the respective section of the input token string is the response to the query when the query is about the content of the respective data item.

\* \* \* \* \*